(12) United States Patent
Hwang et al.

(10) Patent No.: US 12,383,909 B2
(45) Date of Patent: Aug. 12, 2025

(54) FOOD WASTE DISPOSER

(71) Applicant: SAMSUNG ELECTRONICS CO., LTD., Suwon-si (KR)

(72) Inventors: Yongjun Hwang, Suwon-si (KR); Keonpyo Koo, Suwon-si (KR); Kyoungmok Kim, Suwon-si (KR); Daegeon Kim, Suwon-si (KR); Namsoo Park, Suwon-si (KR); Wonyoung Seo, Suwon-si (KR); Jiho Seo, Suwon-si (KR); Hyunnam Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 368 days.

(21) Appl. No.: 17/984,845

(22) Filed: Nov. 10, 2022

(65) Prior Publication Data

US 2023/0211352 A1 Jul. 6, 2023

Related U.S. Application Data

(63) Continuation of application No. PCT/KR2022/015512, filed on Oct. 13, 2022.

(30) Foreign Application Priority Data

Dec. 30, 2021 (KR) .................. 10-2021-0192746

(51) Int. Cl.
*B02C 18/12* (2006.01)
*B02C 18/00* (2006.01)
(Continued)

(52) U.S. Cl.
CPC .......... *B02C 18/12* (2013.01); *B02C 18/0084* (2013.01); *B09B 3/35* (2022.01);
(Continued)

(58) Field of Classification Search
CPC ............ B09B 3/30–40; B09B 2101/70; B02C 2201/06; B02C 2201/066; Y02W 30/40; Y02W 30/52
See application file for complete search history.

(56) References Cited

U.S. PATENT DOCUMENTS

| 5,634,600 A | 6/1997 | Kubota et al. |
| 10,906,046 B2 | 2/2021 | Crepeau et al. |

(Continued)

FOREIGN PATENT DOCUMENTS

| JP | H1094773 A | 4/1998 |
| JP | 3552684 B2 | 8/2004 |

(Continued)

OTHER PUBLICATIONS

International Search Report with Written Opinion issued in International Application No. PCT/KR2022/015512; International Filing Date Oct. 13, 2022; Date of Mailing Feb. 7, 2023 (8 pages).

(Continued)

*Primary Examiner* — Jared O Brown
(74) *Attorney, Agent, or Firm* — CANTOR COLBURN LLP

(57) ABSTRACT

Food waste disposers include a housing, a grinding apparatus mounted inside the housing and configured to grind food waste, and a storage device arranged to store ground food waste. The grinding apparatus includes a grinding case including a discharge hole to allow ground food waste to be transferred to the storage device, a stationary grinder including a plurality of stationary blades coupled to a side wall of the grinding case, a rotary body rotatably coupled to a bottom surface of the grinding case, a first blade extending from the rotary body, the first blade having a first member on a front side and a second member on a rear side with a different shape from each other, and a second blade extend- (Continued)

ing from the rotary body, the second blade having a shape different from a shape of the first blade.

19 Claims, 16 Drawing Sheets

(51) Int. Cl.
  *B09B 3/35* (2022.01)
  *B09B 3/38* (2022.01)
  *B09B 101/70* (2022.01)
  *F26B 25/06* (2006.01)
(52) U.S. Cl.
  CPC ............ *B09B 3/38* (2022.01); *B02C 2201/06* (2013.01); *B09B 2101/70* (2022.01); *F26B 25/06* (2013.01); *Y02W 30/52* (2015.05)

(56) References Cited

U.S. PATENT DOCUMENTS

| | | | |
|---|---|---|---|
| 2022/0001389 A1* | 1/2022 | Maxwell | B02C 18/12 |
| 2023/0001423 A1* | 1/2023 | Seo | B02C 18/0084 |

FOREIGN PATENT DOCUMENTS

| | | | | |
|---|---|---|---|---|
| JP | 2006142211 A | | 6/2006 | |
| KR | 20100008009 U | | 8/2010 | |
| KR | 101053035 B1 | | 8/2011 | |
| KR | 20150001051 A | | 1/2015 | |
| KR | 20150017232 A | | 2/2015 | |
| KR | 101517288 B1 | | 5/2015 | |
| KR | 101521847 B1 | | 5/2015 | |
| KR | 101614895 B1 | | 4/2016 | |
| KR | 101729256 B1 | | 6/2017 | |
| KR | 20190000244 A | | 1/2019 | |
| KR | 20210073663 A | | 6/2021 | |
| KR | 20220091641 A | * | 7/2022 | |
| KR | 20230007222 A | * | 1/2023 | |
| WO | WO-2010008164 A2 | * | 1/2010 | ......... B02C 18/0084 |
| WO | WO-2023282443 A1 | * | 1/2023 | .............. A47J 43/25 |

OTHER PUBLICATIONS

Extended European Search Report corresponding to Application No. 22916325.8-1014; Dated Feb. 20, 2025.

* cited by examiner

FOOD WASTE DISPOSER

CROSS-REFERENCE TO RELATED APPLICATION(S)

This application is a continuation application, under 35 U.S.C. § 111(a), of international application No. PCT/KR2022/015512, filed on Oct. 13, 2022, which claims priority to Korean Patent Application No. 10-2021-0192746, filed on Dec. 30, 2021, in the Korean Intellectual Property Office, the disclosure of which is incorporated by reference herein in its entirety

BACKGROUND

1. Field

The disclosure relates to a food waste disposer, and more particularly to a food waste disposer including an improved structure.

2. Description of Related Art

Generally, a food waste disposer is a device that disposes of food waste by drying, stirring, and grinding the food waste. The food waste disposer may include a grinding apparatus configured to stir and grind food waste. Further, the food waste disposer may include a heat generator for applying heat to the grinding apparatus so as to dry the food waste in the grinding apparatus.

The grinding apparatus includes a grinding case corresponding to a container in which the food waste is heated and ground, and a grinder rotatable inside the grinding case.

However, in a process of stirring and grinding the food waste, the food waste may gradually move toward an edge of the grinding case, and thus a performance of food waste disposal may be deteriorated.

SUMMARY

Therefore, it is an aspect of the disclosure to provide a food waste disposer capable of including an improved grinder to improve a performance of food waste disposal.

It is another aspect of the disclosure to provide a food waste disposer capable of including an improved structure to facilitate an internal heat circulation.

Additional aspects of the disclosure will be set forth in part in the description which follows and, in part, will be obvious from the description, or may be learned by practice of the disclosure.

In accordance with an aspect of the disclosure, a food waste disposer includes a housing, a grinding apparatus detachably mounted inside the housing and configured to grind food waste, and a storage device arranged below the grinding apparatus so as to store ground food waste. The grinding apparatus includes a grinding case including a discharge hole opened to allow the ground food waste to be transferred to the storage device, a stationary grinder including a plurality of stationary blades coupled to a side wall of the grinding case and provided to extend inwardly, a rotary body rotatably coupled to a bottom surface of the grinding case, a first blade extending from the rotary body to grind food waste and provided to rotate between the plurality of stationary blades, the first blade in which a first member positioned in a front side with respect to a rotation direction and a second member positioned in a rear side with respect to the rotation direction have different shapes from each other, and a second blade extending from the rotary body and provided to rotate between the plurality of stationary blades, the second blade having a shape different from a shape of the first blade.

The first member of the first blade may include a toothed member and the second member may include a grinding member.

The first member of the first blade may be provided to be inclined toward an end with respect to the rotation direction.

A thickness of the first member may be less than or equal to a thickness of the second member with respect to a vertical direction.

The second blade may include a blade member formed in a front side and a rear side with respect to the rotation direction.

The food waste disposer may further include a third blade extending from the rotary body to stir food waste and provided to rotate above the plurality of stationary blades, and a fourth blade extending from the rotary body and provided to rotate under the plurality of stationary blades to transfer food waste from the bottom surface of the grinding case to the discharge hole. A width of an upper surface of the third blade may become smaller outwardly in a radial direction.

The fourth blade may include a concave member recessed inward from a front side and a rear side with respect to the rotation direction.

The concave member may be provided to be connected to the rotary body along a tangential direction of an outer surface of the rotary body.

The first blade and the second blade may be positioned at the same height as each other.

The grinding apparatus may further include a valve assembly including a ball valve arranged below the grinding case and configured to open and close the discharge hole, the valve assembly provided to be detached toward an outside of the housing, together with the grinding case.

The grinding apparatus further comprises a fourth blade having a recess recessed inward from a lower surface to prevent interference with the ball valve protruding toward an upper portion of the bottom surface through the discharge hole of the grinding case.

The valve assembly may further include a first driving device configured to supply a driving force to the rotary body, and a second driving device configured to supply a driving force to the ball valve. The grinding apparatus may be detached from the second driving device in response to the discharge hole being closed by the ball valve.

The food waste disposer may further include a heat generator configured to heat the grinding apparatus, and a cover device coupled to an upper portion of the housing so as to open and close the grinding apparatus, the cover device including a circulation fan received inside the cover device so as to circulate heat inside the grinding apparatus.

The food waste disposer may further include a cap member mounted to an upper portion of the rotary body to prevent foreign substances from being introduced into the rotary body.

The first blade may extend from the rotary body in a curved shape along the rotation direction, and the second blade may extend from the rotary body in the curved shape along a direction opposite to the rotation direction.

In accordance with another aspect of the disclosure, a food waste disposer includes a housing, a grinding case detachably mounted inside the housing and configured to grind heated food waste and including a discharge hole formed on a bottom surface, a cover device coupled to the housing so as to open and close the grinding case, and including a circulation fan provided to circulate heat inside the grinding case, a stationary grinder including a plurality of stationary blades coupled to a side wall of the grinding case and provided to extend inwardly, a rotary body rotatably coupled to the grinding case, a first blade extending from the rotary body in a curved shape, so as to grind food waste and provided to rotate between the plurality of stationary blades, the first blade including a toothed member formed on one side with respect to a rotation direction and a grinding member formed on a side opposite to the one side with respect to the rotation direction, and a second blade extending from the rotary body in the curved shape along a direction opposite to an extension direction of the first blade and provided to rotate between the plurality of stationary blades.

The food waste disposer may further include a third blade extending from the rotary body to stir food waste and provided to rotate above the plurality of stationary blades, and a fourth blade extending from the rotary body and provided to rotate under the plurality of stationary blades to transfer food waste from the bottom surface of the grinding case to the discharge hole, the fourth blade including a concave member recessed inward from a front side and a rear side with respect to the rotation direction, and connected to the rotary body along a tangential direction of an outer surface of the rotary body.

Each of the plurality of stationary blades of the stationary grinder may include a chamfer inclined toward a side end.

In accordance with another aspect of the disclosure, a food waste disposer includes a housing, a grinding apparatus arranged inside the housing so as to grind food waste, and a storage device arranged below the grinding apparatus to allow the processed food waste to be transferred from the grinding apparatus and then stored, a deodorizing device arranged at a rear of the grinding apparatus to discharge polluted air generated from the grinding apparatus to an outside, and a cover device coupled to the housing so as to open and close an upper portion of the grinding case, and including a circulation fan configured to circulate heat inside the grinding case. The grinding apparatus includes a grinding case, a stationary grinder including a plurality of stationary blades coupled to a side wall of the grinding case and provided to extend inwardly, a rotary grinder rotatably installed mounted inside the grinding case so as to grind food waste by an interaction with the stationary grinder, and including a plurality of blades having different shapes.

The rotary grinder may further include a rotary body to which a drive shaft is connected. The plurality of blades may include a first blade provided to rotate between the plurality of stationary blades and extending from the rotary body in a curved shape, and a second blade provided to rotate between the plurality of stationary blades and extending from the rotary body in the curved shape along a direction opposite to an extension direction of the first blade.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
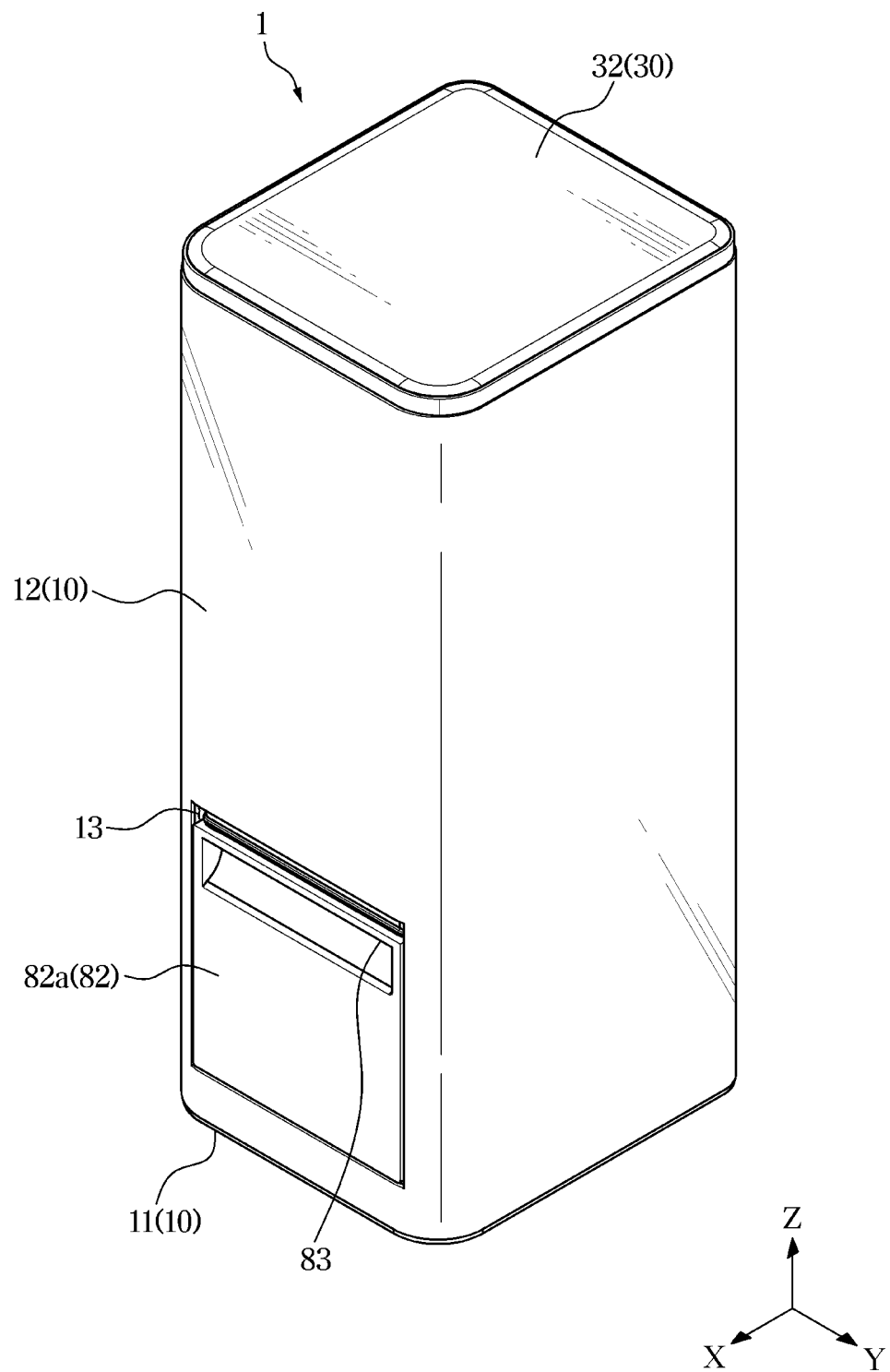
FIG. 1 is a front-perspective view of a food waste disposer according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The disclosure will be described more fully hereinafter with reference to the accompanying drawings.

Figure 2:
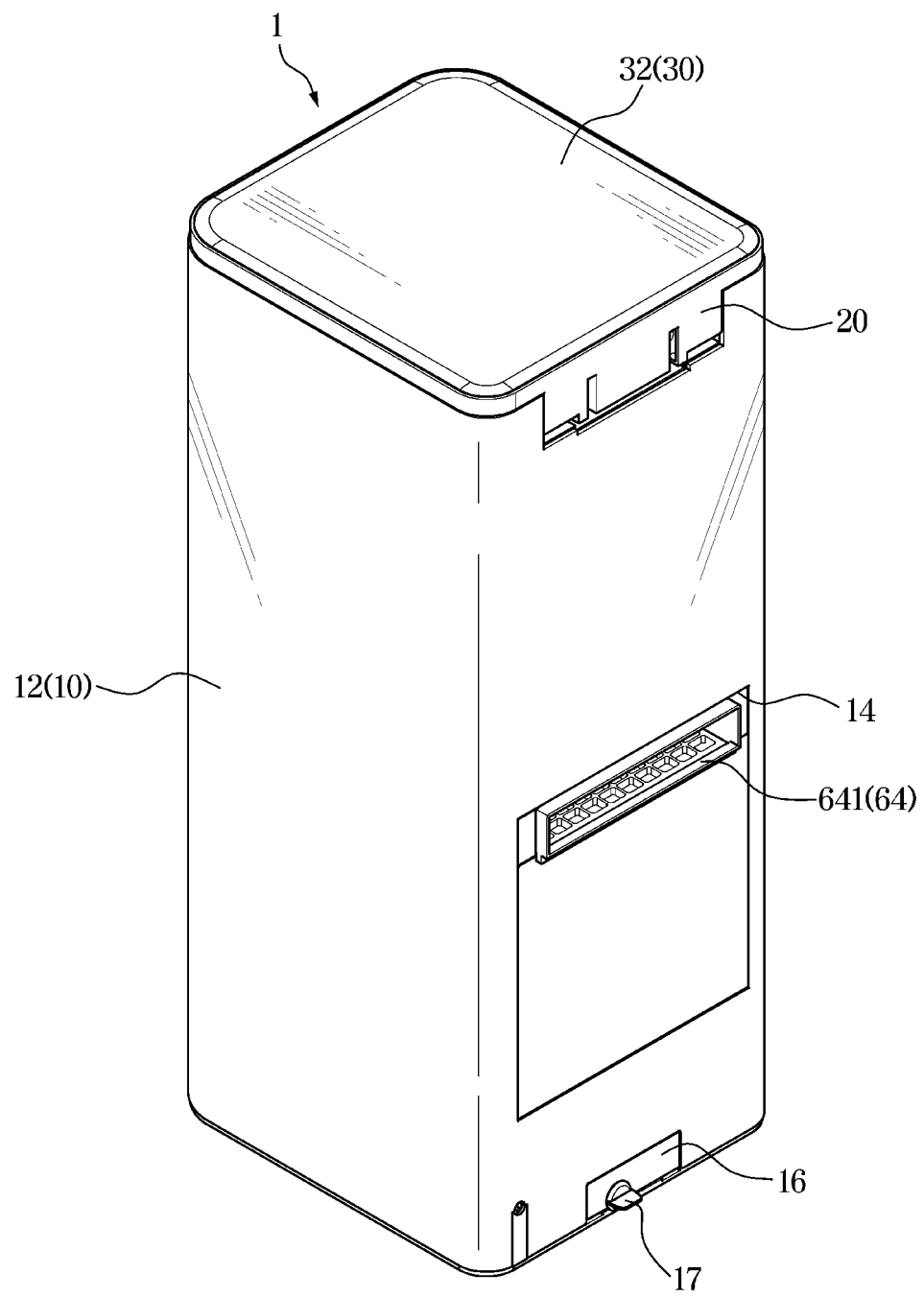
FIG. 2 is a rear-perspective view of the food waste disposer according to an embodiment of the disclosure.

FIG. 1 is a front-perspective view of a food waste disposer according to an embodiment of the disclosure. FIG. 2 is a rear-perspective view of the food waste disposer according to an embodiment of the disclosure.

Referring to FIGS. 1 and 2, a food waste disposer 1 may include a housing 10 and a cover device 30 covering an upper portion of the housing 10.

The housing 10 may form an exterior of the food waste disposer 1. For example, the housing 10 may include a base housing 11 and a side housing 12 arranged on the base housing 11. The base housing 11 and the side housing 12 may be detachably coupled to each other FIGS. 1 and 2 illustrate that the side housing 12 is formed integrally, but is not limited thereto.

Alternatively, the side housing 12 may be provided with a plurality of panels provided to be coupled to each other. In this case, by separating the structure or components of the housing 10, a user or a repairman can easily access various parts arranged inside the food waste disposer 1.

For example, the base housing 11 may form a bottom surface of the food waste disposer 1, and the side housing 12 may form a side surface of the food waste disposer 1. For example, the side housing 12 may include four sidewalls. However, the disclosure is not limited thereto, and it is sufficient that the side housing 12 has a shape that covers various parts provided inside the housing 10. For example, in some embodiments, the side housing may have a rounded or curved geometry (e.g., cylindrical housing), and it will be appreciated that other geometric shapes may be employed without departing from the scope of the present disclosure. In a cylindrical configuration, the side housing may include a single, continuous sidewall, although such cylindrical shape may be formed from two or more arcuate sidewall panels or the like.

The food waste disposer 1 may include a receiving member 13 formed inside the housing 10. The receiving member 13 maybe arranged at or in or defined by an opening on a side (e.g., front) of the housing 10.

The receiving member 13 may be provided to receive a storage case 82 to be described later. The storage case 82 may be provided to be withdrawn from and inserted with respect to the receiving member 13. For example, the storage case 82 may slide along a front and rear direction of the food waste disposer 1 to be withdrawn from the receiving member 13 or inserted into the receiving member 13.

A grip 83 provided to be gripped may be provided on a front surface 82a of the storage case 82. For example, the grip 83 may have a shape recessed backward from the front surface 82a of the storage case 82.

Although not shown in the drawings, a window may be provided on the front surface 82a of the storage case 82 to allow a user to visually check an amount of food waste inside the storage case 82. The window may be formed of a transparent material.

The food waste disposer 1 may include an exhaust hole 14 provided at a rear of the housing 10, as shown in FIG. 2.

The exhaust hole 14 may be provided to communicate a discharge port 641 of a filter assembly 64 to be described later. The exhaust hole 14 may be opened at the rear surface of the housing 10 to allow the discharge port 641 to communicate with the outside of the housing 10.

The filter assembly 64 may filter exhaust gas and discharge the filtered gas to the outside of the housing 10. In this case, the filtered gas may be discharged to the outside of the housing 10 through the exhaust hole 14.

The food waste disposer 1 may include a service cover 16 and a cover cap 17.

The service cover 16 may be provided at a rear of the housing 10. The service cover 16 may be detachably mounted to the rear of the housing 10.

A cover cap 17 may be inserted into a port or the like formed in one side of the service cover 16.

Condensed water generated inside the food waste disposer 1 may be discharged to the outside through the port by removing the cover cap 17.

Figure 3:
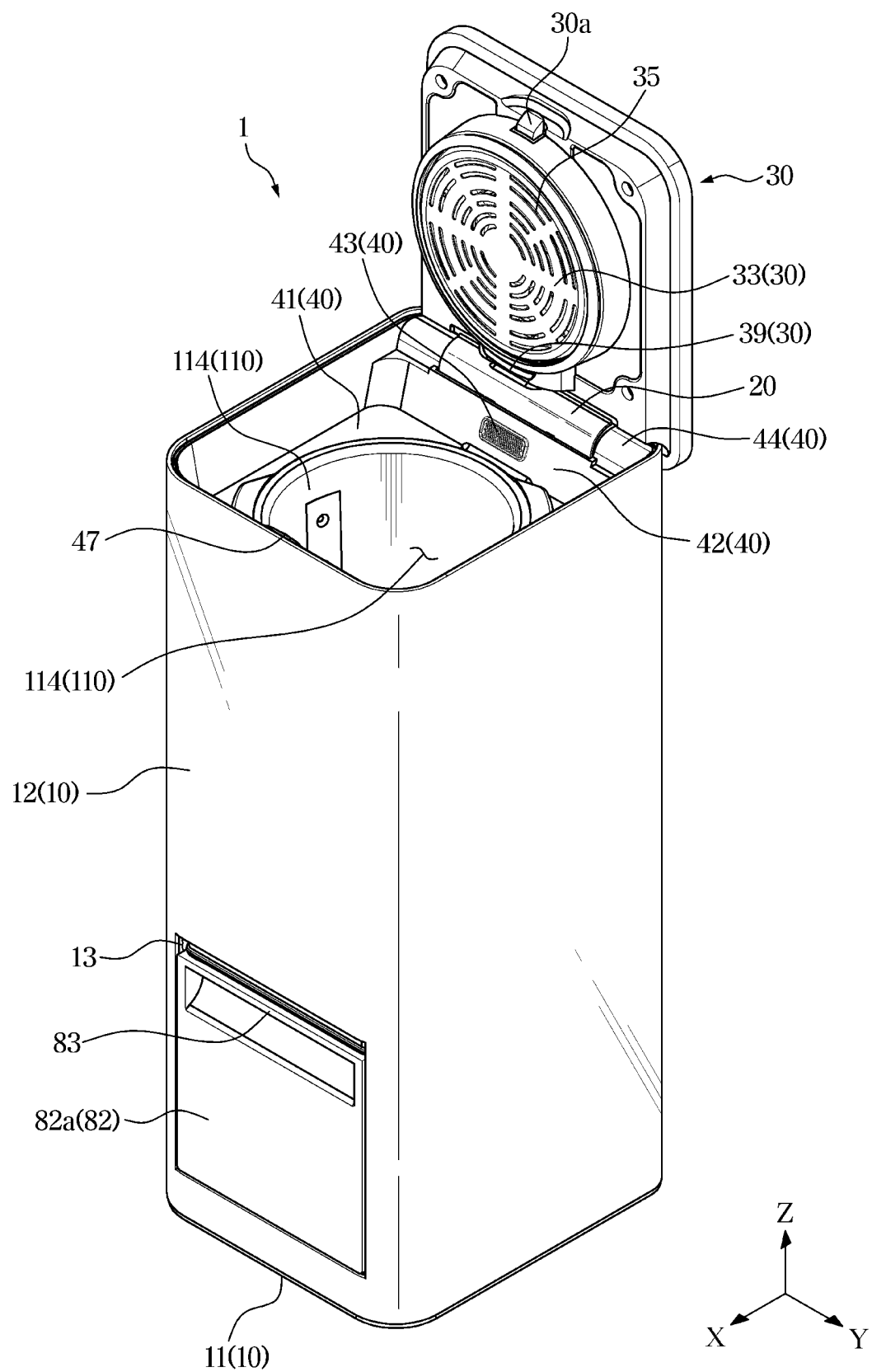
FIG. 3 is a view illustrating an open state of a cover device of the food waste disposer according to an embodiment of the disclosure.
Figure 4:
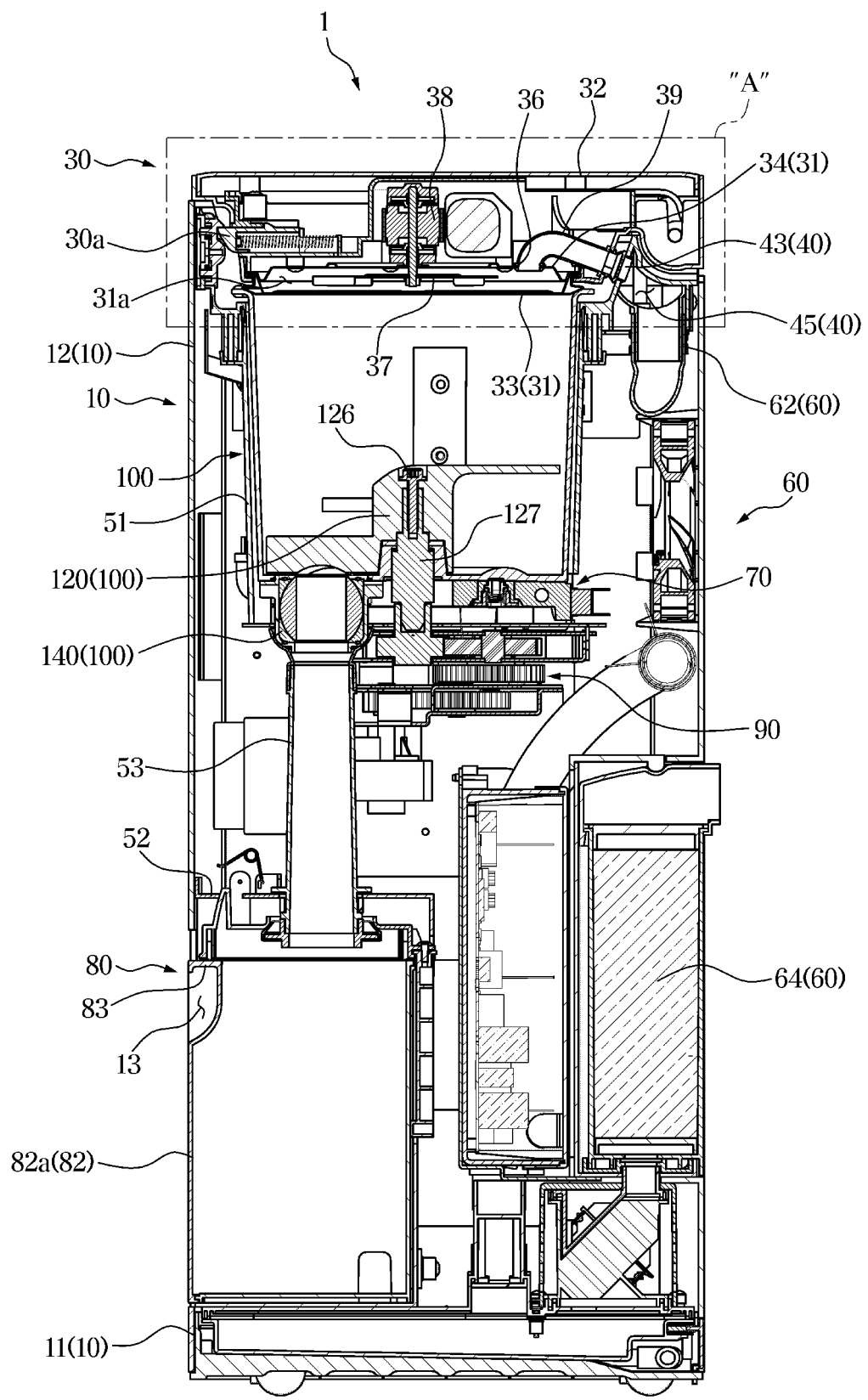
FIG. 4 is a cross-sectional view of the food waste disposer according to an embodiment of the disclosure.
Figure 5:
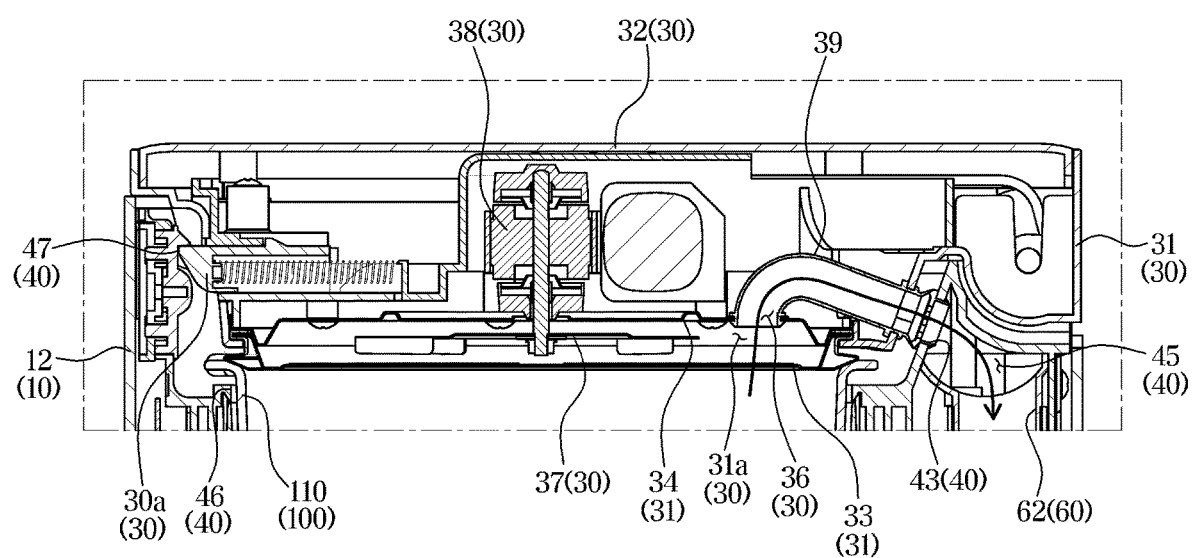
FIG. 5 is an enlarged view of a part A as indicated in FIG. 4.

FIG. 3 is a view illustrating an open state of a cover device 30 of the food waste disposer 1 according to an embodiment of the disclosure. FIG. 4 is a cross-sectional view of the food waste disposer 1 according to an embodiment of the disclosure. FIG. 5 is an enlarged view of a part A as indicated in FIG. 4

Referring to FIGS. 3 to 5, the food waste disposer 1 may include a support frame 40.

The support frame 40 may be arranged inside the housing 10 so as to support a grinding apparatus 100. In some embodiments the support frame 40 may support an upper portion of the grinding apparatus 100. In some embodiments, the support frame 40 may support an upper outer circumferential surface of the grinding apparatus 100 so as to allow the grinding apparatus 100 to be stably positioned inside the housing 10.

The support frame 40 may include a hinge coupler 44 provided to be coupled to a hinge 20 (also shown in FIG. 3).

The support frame 40 may include a base member 41 and an extension member 42.

The base member 41 may form an upper surface of the support frame 40. The extension member 42 may extend from the base member 41. The extension member 42 may extend upwardly to correspond to a portion of the side housing 12. For example, the hinge coupler 44 may be formed on one side of the extension member 42 adjacent to the hinge 20.

The base member 41 may include an insertion hole 46 into which the grinding apparatus 100 may be inserted. The grinding apparatus 100 may be inserted into the housing 10 through the insertion hole 46 and supported by the support frame 40.

The support frame 40 may include a suction port 43. Although a single suction port 43 is illustrated, it will be appreciated that the support frame may include a plurality of suction ports, without departing from the scope of the present disclosure.

The suction port 43 may be provided to communicate with the grinding apparatus 100. For example, in response to closing the upper portion of the housing 10 by the cover device 30, the suction port 43 may communicate with the grinding apparatus 100 through the cover device 30.

In response to closing the housing 10 by the cover device 30, exhaust gas in the grinding apparatus 100 may flow into the cover device 30, and the exhaust gas flowing into the cover device 30 may be sucked into the suction port 43 of the support frame 40 through a guide duct 39 to be described later.

The support frame 40 may include a connection flow path 45. The connection flow path 45 may form a part of a flow path through which the exhaust gas flows. For example, the connection flow path 45 may connect the guide duct 39 and an exhaust duct 62 of a deodorizing device 60 to be described later.

Figure 6:
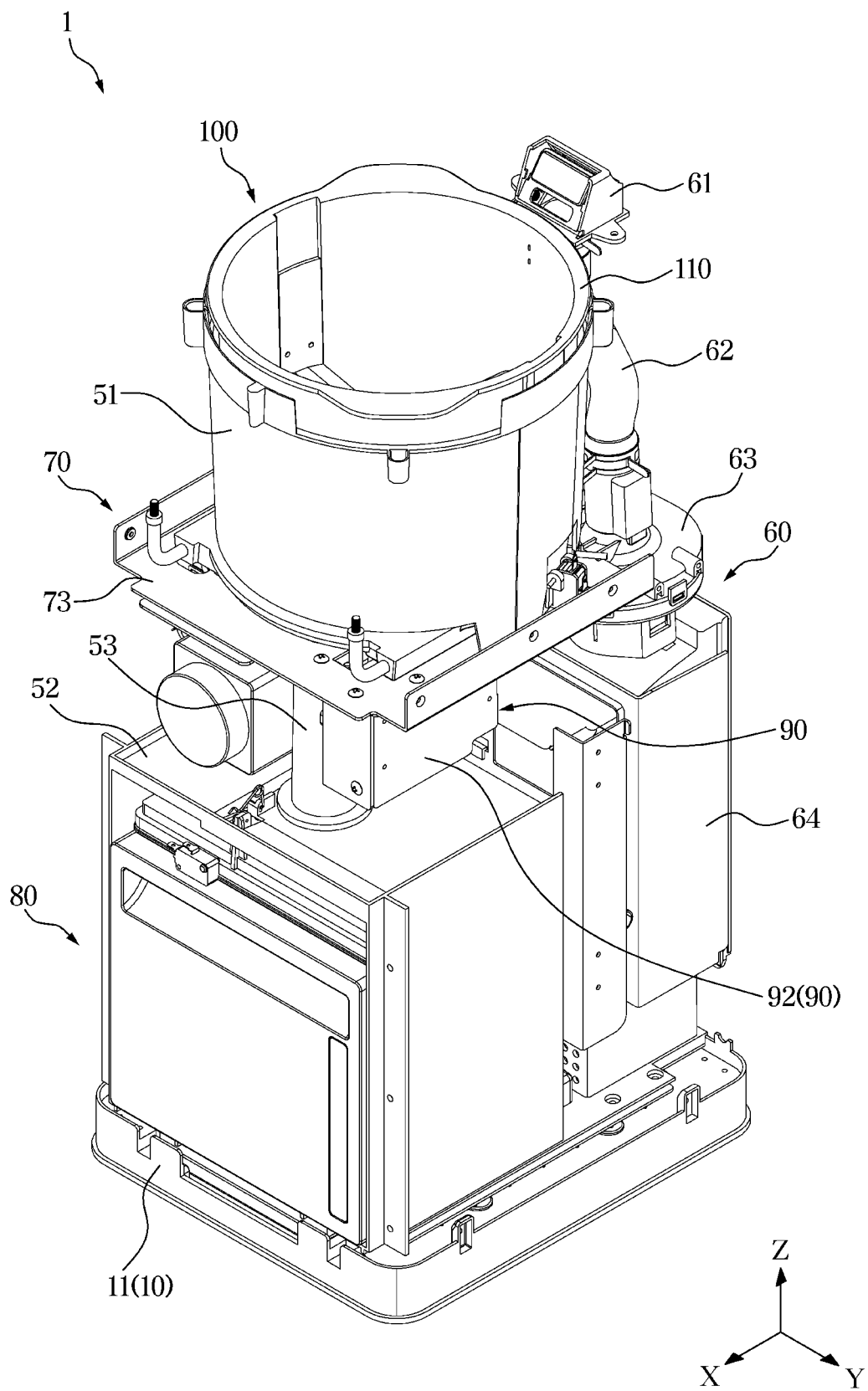
FIG. 6 is a view illustrating a main configuration of the food waste disposer according to an embodiment of the disclosure.
Figure 7:
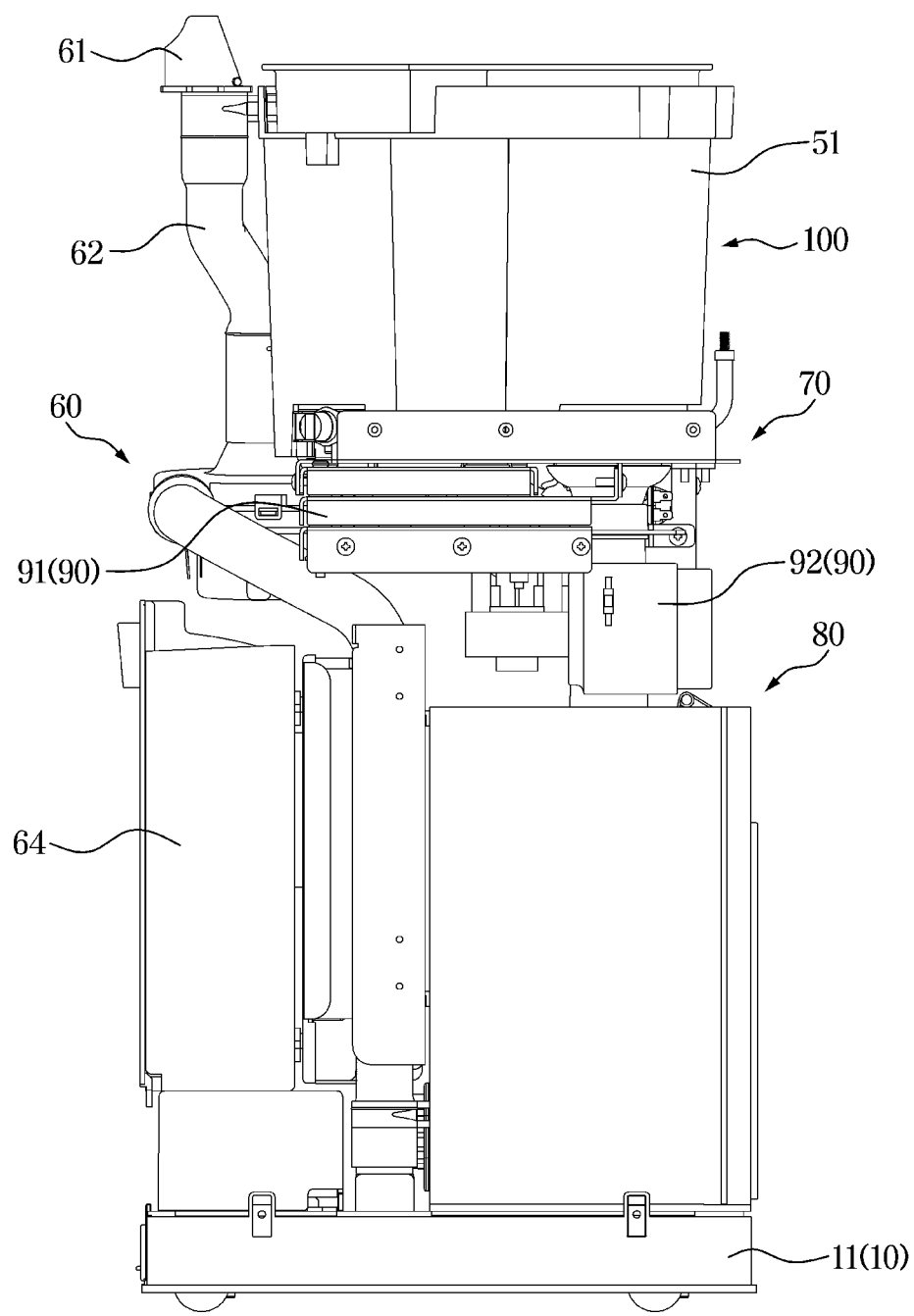
FIG. 7 is a side view of the food waste disposer shown in FIG. 6.

Particularly, the connection flow path 45 may connect the guide duct 39 to an inlet duct 61 mounted to an end of the exhaust duct 62 of the deodorizing device 60 (e.g., as shown in FIGS. 6-7).

The support frame 40 may include a latch insert 47. The cover device 30 may be rotatable with respect to the support frame 40, and thus the latch insert 47 may be provided to fix a position of the cover device 30 in a state in which the cover device 30 closes the upper portion of the housing 10.

The food waste disposer 1 may include the grinding apparatus 100.

The grinding apparatus 100 may be provided to store food waste, and configured to grind the stored food waste. The grinding apparatus 100 may be arranged inside the housing 10. The grinding apparatus 100 may be mounted to the housing 10 to be detachable from the inside of the housing 10.

As shown in FIG. 3, the grinding apparatus 100 may include a grinding case 110 including an inlet 114 that is open and arranged in an upper portion of the grinding case 110. A user may input food waste into the grinding apparatus 100 through the inlet 114 of the grinding apparatus 100.

A grinding apparatus cover 31 of the cover device 30 may cover the inlet 114. The grinding apparatus cover 31 may be provided as a size corresponding to the inlet 114. In some embodiments, the inlet 114 may be provided as a size corresponding to the insertion hole 46 of the support frame 40. Details of the grinding apparatus 100 will be described later.

The cover device 30 may be rotatably coupled to one side of the support frame 40 so as to open and close the inlet 114 of the grinding case 110 of the grinding apparatus 100.

The cover device 30 may include the grinding apparatus cover 31 and a top plate 32.

The grinding apparatus cover 31 may be provided to cover the open upper surface of the grinding apparatus 100. Particularly, the grinding apparatus cover 31 may be provided to cover the inlet 114 of the grinding apparatus 100. The grinding apparatus cover 31 may be provided to cover the upper portion of the grinding case 110 provided to store and grind food waste.

The top plate 32 may form an upper surface of the food waste disposer 1.

The grinding apparatus cover 31 and the top plate 32 may be vertically coupled to form an upper surface and a lower surface of the cover device 30.

The grinding apparatus cover 31 may include a lower frame 33 provided to face the grinding case 110 in response to closing the housing 10 by the cover device 30, and an upper frame 34 coupled to an upper side of the lower frame 33. The lower frame 33 and the upper frame 34 may be vertically coupled to form a predetermined receiving space 31a therebetween.

A circulation fan 37 may be arranged in the receiving space 31a formed between the lower frame 33 and the upper frame 34. The circulation fan 37 may allow or cause heat inside the grinding case 110 to spread evenly within the grinding case 110. Particularly, a heat generator 70, provided under the grinding apparatus 100, may be configured to heat the grinding apparatus 100, resulting in the inside of the grinding apparatus 100 to be heated.

In this case, in the grinding apparatus 100, food waste near the heat generator 70 may be more heated and thus the heat may be non-uniformly transferred to the food waste stored in the grinding apparatus 100.

However, because the circulation fan 37 is arranged on the cover device 30, the heat inside the grinding apparatus 100 may be circulated as a whole. In other words, a convection phenomenon may occur inside the grinding case 110 as a result of operation of the heat generator 70 and the circulation fan 37. Accordingly, a temperature inside the grinding case 110 may be uniform regardless of a position of the food waste, and a drying efficiency of the food waste received in the grinding case 110 may be improved.

The cover device 30 may include a fan drive 38. The fan drive 38 may be configured to drive the circulation fan 37. The fan drive 38 may be provided between the top plate 32 and the grinding apparatus cover 31.

The lower frame 33 may include a first communication hole 35. The first communication hole 35 may be provided in plurality (e.g., slotted openings as shown in FIG. 3). The upper frame 34 may include a second communication hole 36.

Air may be sucked into the cover device 30 from the grinding apparatus 100 through the first communication hole 35. The sucked air may flow into the second communication hole 36 formed in the upper frame 34.

The cover device 30 may include the guide duct 39.

The guide duct 39 may be provided to rotate in accordance with a rotation of the cover device 30. For example, in response to closing the upper portion of the housing 10 by the cover device 30, one end of the guide duct 39 may be arranged to face the grinding case 110 together with the grinding apparatus cover 31.

For example, in response to closing the upper portion of the housing 10 by the cover device 30, one end of the guide duct 39 may face downward.

The guide duct 39 may be mounted inside the cover device 30. One end of the guide duct 39 may be fixed to the upper frame 34. The guide duct 39 may extend in a curved shape. However, the shape of the guide duct 39 is not limited thereto. The position and shape of the guide duct 39 may vary as long as the guide duct 39 guides the exhaust gas in the grinding case 110 to the exhaust duct 62.

Air in the grinding case 110 may flow into the receiving space 31a of the grinding apparatus cover 31 through the first communication hole 35 of the lower frame 33. The air flowing into the receiving space 31a of the grinding apparatus cover 31 may flow to one end of the guide duct 39 through the second communication hole 36 of the upper frame 34.

The air flowing to the one end of the guide duct 39 may flow to the connection flow path 45 through the suction port 43 of the support frame 40. The air flowing to the connection flow path 45 may flow to the exhaust duct 62 of the deodorizing device 60 (e.g., shown in FIGS. 6-7).

However, in some alternative embodiments, the structure may be changed to allow the air of the grinding case 110 to directly flow to the exhaust duct 62.

The cover device 30 may include a latch 30a.

The latch 30a may be mounted on the grinding apparatus cover 31 of the cover device 30. The latch 30a may be provided to be elastically movable forward and backward. The latch 30a may be provided to be inserted into the latch insert 47 of the support frame 40. Accordingly, in response to closing the upper portion of the housing 10 by the cover device 30, a closed state of the cover device 30 may be maintained by the latch 30a. That is, in accordance with some embodiments, the engagement between the latch 30a and the latch insert 47 may provide a releasable locking mechanism between the cover device 30 and the housing 10.

The shape of the latch 30a is not limited to this illustrative embodiment. For example, the latch 30a may be provided in a simple protrusion shape to temporarily fix the position of the cover device 30. It will be appreciated that other types of releasable or temporary fixation type mechanisms may be employed without departing from the scope of the present disclosure.

Figure 8:
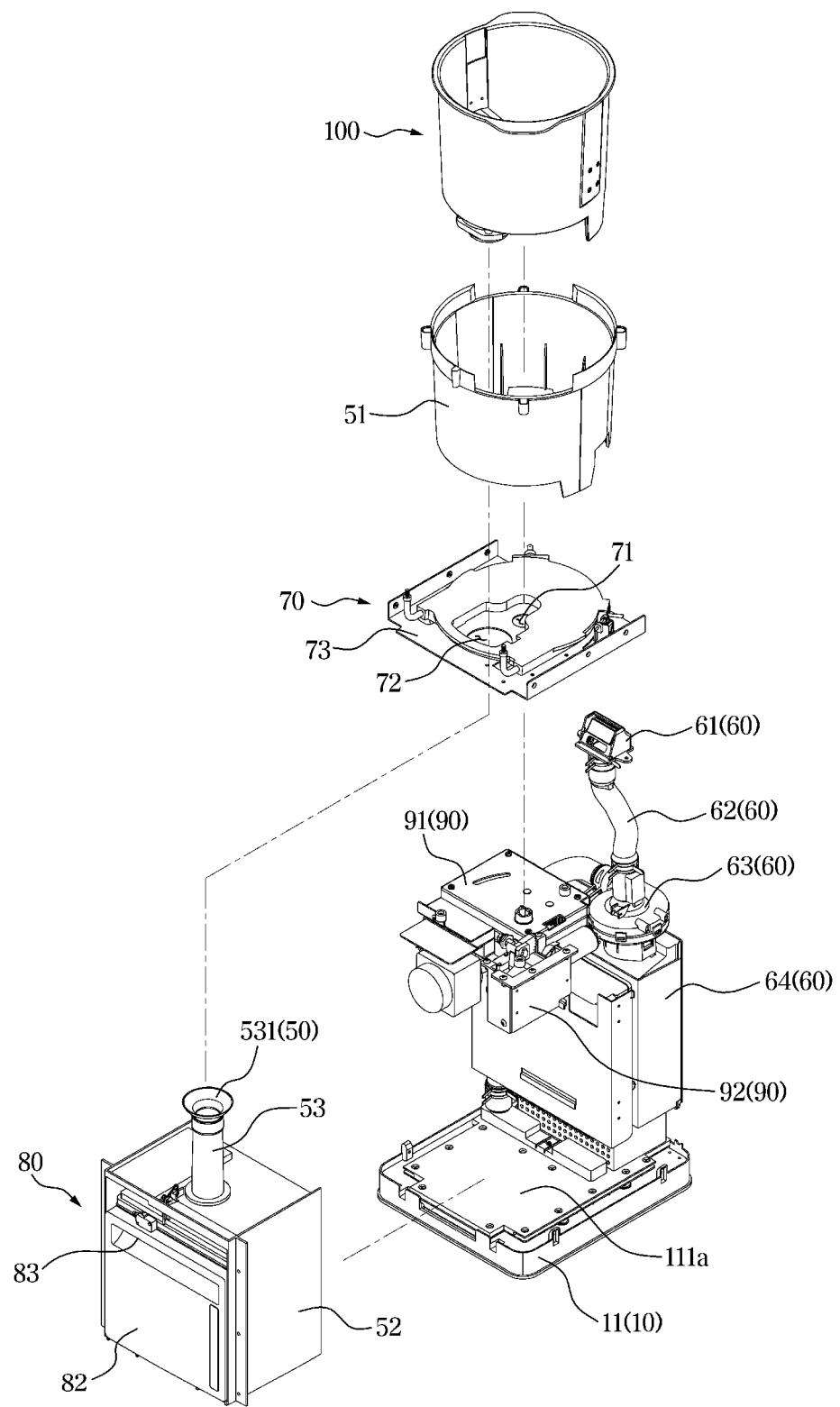
FIG. 8 is an exploded-perspective of the food waste disposer shown in FIG. 6.

FIG. 6 is a view illustrating a main configuration of the food waste disposer according to an embodiment of the disclosure. FIG. 7 is a side view of the food waste disposer shown in FIG. 6. FIG. 8 is an exploded-perspective of the food waste disposer shown in FIG. 6.

Referring to FIGS. 6 to 8, the food waste disposer 1 may include the grinding apparatus 100. The grinding apparatus 100 may be arranged under the above-described cover device 30 to be opened and closed by the cover device 30. The cover device 30 may be configured to open and close the open upper surface of the grinding apparatus 100.

The grinding apparatus 100 may include the grinding case 110 in which food waste is ground.

The food waste disposer 1 may include a case frame 51. The case frame 51 may be provided to receive the grinding apparatus 100. The case frame 51 may be provided in a shape corresponding to the grinding apparatus 100. For example, the case frame 51 may be provided in a substantially cylindrical shape with an open upper surface.

The food waste disposer 1 may include the heat generator 70.

The heat generator 70 may be arranged below the grinding apparatus 100 so as to heat the grinding apparatus 100. In some embodiments, the heat generator 70 may include a heating wire embedded therein. Although described with a heating wire, those of skill in the art will appreciate that other types of heating elements and/or mechanisms may be employed without departing from the scope of the present disclosure. The heat generator 70 may be arranged under the grinding case 110.

The heat generator 70 may be coupled to the case frame 51. The case frame 51 may be arranged above the heat generator 70, and the grinding apparatus 100 may be arranged inside the case frame 51.

Accordingly, as the heat generator 70 heats a lower side of the grinding apparatus 100, the food waste inside the grinding apparatus 100 may be dried. In addition, as the circulation fan 37 is arranged in the cover device 30 as described above, heat inside the grinding apparatus 100 may be circulated throughout the interior of the griding apparatus 100, thereby evenly drying the food waste.

The heat generator 70 may include a mounting frame 73. The mounting frame 73 may be coupled to various fixed frames (not shown) provided inside the housing 10. Accordingly, the upper portion of the grinding apparatus 100 may be supported by the support frame 40 and the lower portion of the grinding apparatus 100 may be supported by the mounting frame 73 of the heat generator 70.

The heat generator 70 may include a shaft through hole 71 and a valve through hole 72.

The shaft through hole 71 may be provided to allow a drive shaft of a first driving device 91 to pass therethrough. The drive shaft of the first driving device 91 may be coupled to a grinder shaft 127 (refer to FIG. 4). Accordingly, the first driving device 91 may pass through the heat generator 70 to transmit the driving force to the grinding apparatus 100.

The valve through hole 72 may be formed in front of the shaft through hole 71. The valve through hole 72 may be provided to allow a valve assembly 140 (refer to FIG. 9), which protrudes from the lower portion of the grinding apparatus 100, to pass therethrough. The valve assembly 140 protruding to the lower portion of the heat generator 70 through the valve through portion 72 may be connected to a second driving device 92 to be described later. Details related to this will be described later.

The food waste disposer 1 may include a driving device 90.

The driving device 90 may include the first driving device 91 and the second driving device 92.

The first driving device 91 may supply power to cause a rotary grinder 120 of the grinding apparatus 100 to rotate inside the grinding case 110.

The second driving device 92 may supply power to cause a ball valve 142 of the valve assembly 140 of the grinding apparatus 100 to rotate to open and close the discharge port 641. The second driving device 92 may be connected to the valve assembly 140, which passes through the heat generator 70, to supply a driving force to the ball valve 142.

In some embodiments, the second driving device 92 may be provided to restrict an upward movement of the grinding apparatus 100 or may be provided to allow a free upward movement of the grinding apparatus 100 according to a rotation state of the ball valve 142. Details related to this will be described later.

The first driving device 91 and the second driving device 92 may be provided to include drive shafts perpendicular to each other. For example, the first driving device 91 may include a drive shaft extending along a Z-direction, which is a vertical direction of the food waste disposer 1. Accordingly, the rotary grinder 120 connected to the first driving device 91 may be rotatable in a X-Y plane of the food waste disposer 1.

Further, the second driving device 92 may include a drive shaft extending along a Y-direction corresponding to a left and right direction of the food waste disposer 1. Accordingly, the ball valve 142 connected to the second driving device 92 may be rotatable on a X-Z plane of the food waste disposer 1.

Therefore, the driving device 90 of the food waste disposer 1 according to an embodiment of the disclosure includes a plurality of drive shafts, with the plurality of drive shafts arranged to be perpendicular to each other. Therefore, in the food waste disposer 1, it is possible to minimize a volume occupied by the driving device 90.

Accordingly, a size of the grinding apparatus 100, in which the food waste is stored, a size of the storage device 80 in which the processed-food waste is stored, or a size of the deodorizing device 60 may be more efficiently provided.

The food waste disposer 1 may include the deodorizing device 60.

The deodorizing device 60 may be provided to suction a stench such as odors generated from the grinding apparatus 100. This may be referred as exhaust gas. The exhaust gas sucked into the deodorizing device 60 may be filtered by the filter assembly 64 and discharged back to the outside of the food waste disposer 1. Particularly, the filtered air may be discharged to the outside through the exhaust hole 14 (refer to FIG. 2) formed in the housing 10.

Particularly, the exhaust gas generated from the grinding apparatus 100 may flow to the cover device 30, and because the cover device 30 and the deodorizing device 60 are provided to communicate with each other, the exhaust gas may flow to the deodorizing device 60.

The deodorizing device 60 may include the inlet duct 61 and the exhaust duct 62. The inlet duct 61 may be provided to connect the exhaust duct 62 to the connection flow path 45 of the support frame 40.

The air of the grinding apparatus 100 may pass through the cover device 30, pass through the suction port 43 of the support frame 40, and flow into the connection flow path 45. Thereafter, the air may be introduced into the inlet duct 61 and flow into the exhaust duct 62.

The deodorizing device 60 may include an exhaust fan assembly 63. The exhaust fan assembly 63 may generate a suction force to introduce air into the deodorizing device 60.

The deodorizing device 60 may include the filter assembly 64. Air generated from the grinding apparatus 100 may be filtered through the filter assembly 64. The filter assembly 64 may include the discharge port 641 (refer to FIG. 2). The filter assembly 64 may include one or more filter components or mechanisms, including, but not limited to, HEPA filters, UV light filters, electrostatic filters, washable filters, media filters, spun glass filters, pleated filters, or the like. The discharge part 641 may communicate with the exhaust hole 14 of the housing 10.

The food waste disposer 1 may include the storage device 80.

The storage device 80 may be provided to transport and store food waste which is dried and ground by the grinding apparatus 100. The storage device 80 may be arranged under the grinding apparatus 100 to allow the ground food waste to be naturally transported by gravity from the grinding apparatus 100 to the storage device 80.

The food waste disposer 1 may include a receiving frame 52 and a transfer duct 53.

The storage device 80 may be arranged inside the receiving frame 52. Particularly, the storage device 80 may be received in the receiving frame 52 to be withdrawn to the outside of the receiving frame 52.

Figure 14:
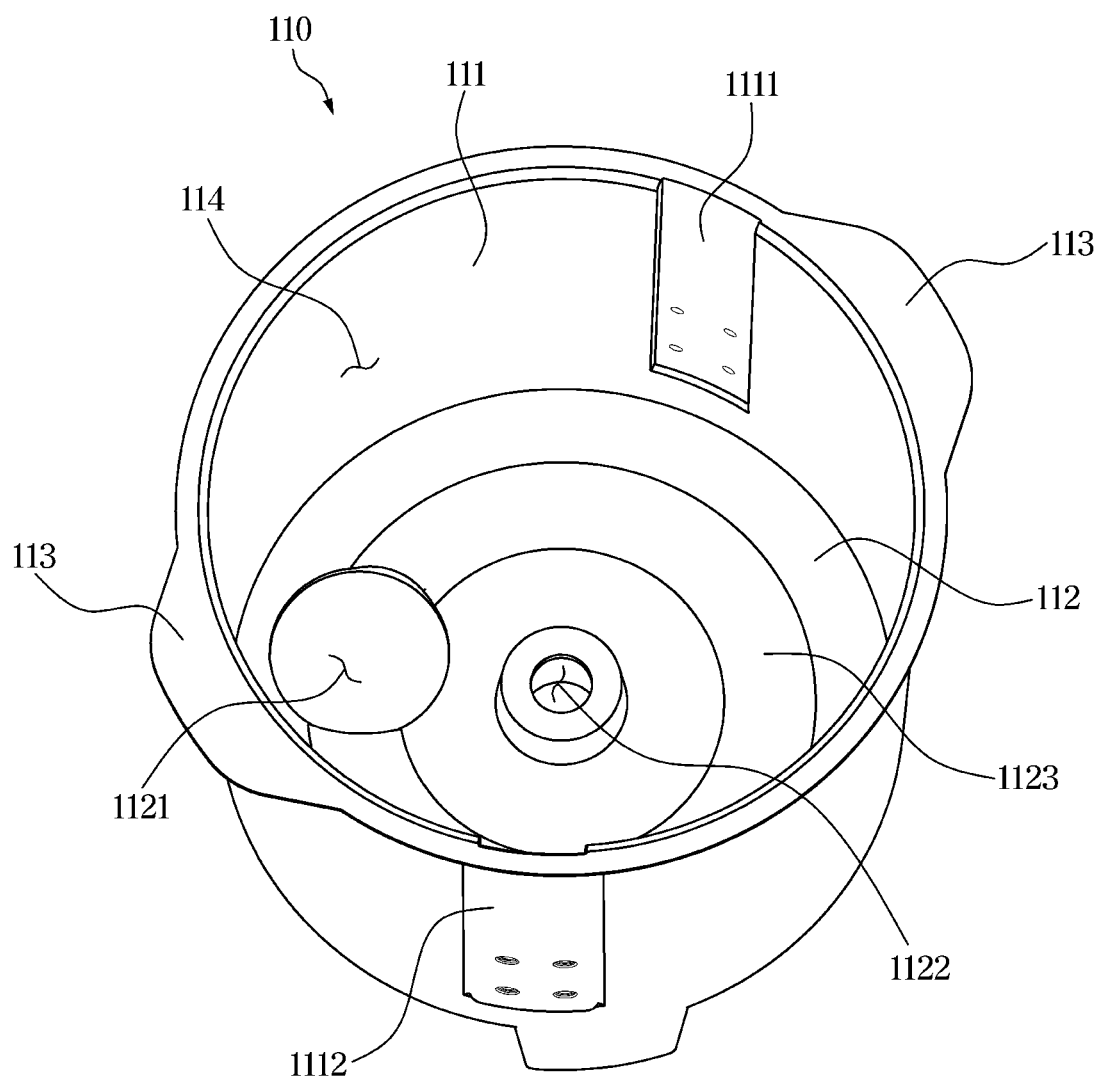
FIG. 14 is a perspective view illustrating an inside of a grinding case shown in FIG. 9.

The transfer duct 53 may be connected to an upper surface of the receiving frame 52. The transfer duct 53 may include an inlet member 531 formed at an upper end thereof. The inlet member 531 may be provided to be connected to the valve assembly 140 of the grinding apparatus 100 so as to communicate with a discharge hole 1121 of the grinding apparatus 100 (FIG. 14).

Accordingly, the processed-food waste may be moved from the grinding apparatus 100 to the valve assembly 140 through the discharge hole 1121, and then moved to the transfer duct 53 through the inlet member 531 of the transfer duct 53.

The food waste transferred to the transfer duct 53 may be moved to the storage case 82 through the upper portion of the storage case 82 of the storage device 80. A portion of the upper surface of the storage case 82 may be opened to communicate with the transfer duct 53.

The base housing 11 may include a storage device mounting member 111*a*.

The storage device 80 may be mounted on the storage device mounting member 111*a*. In addition, the receiving frame 52 may be mounted on the storage device mounting member 111*a*.

Accordingly, an upper surface, a lower surface, and both side surfaces, except for the front surface 82*a*, of the storage device 80 may be covered by the base housing 11 and the receiving frame 52. Therefore, the storage device 80 may be provided to be withdrawn forward without being fixed to the storage device mounting member 111*a*.

Figure 9:
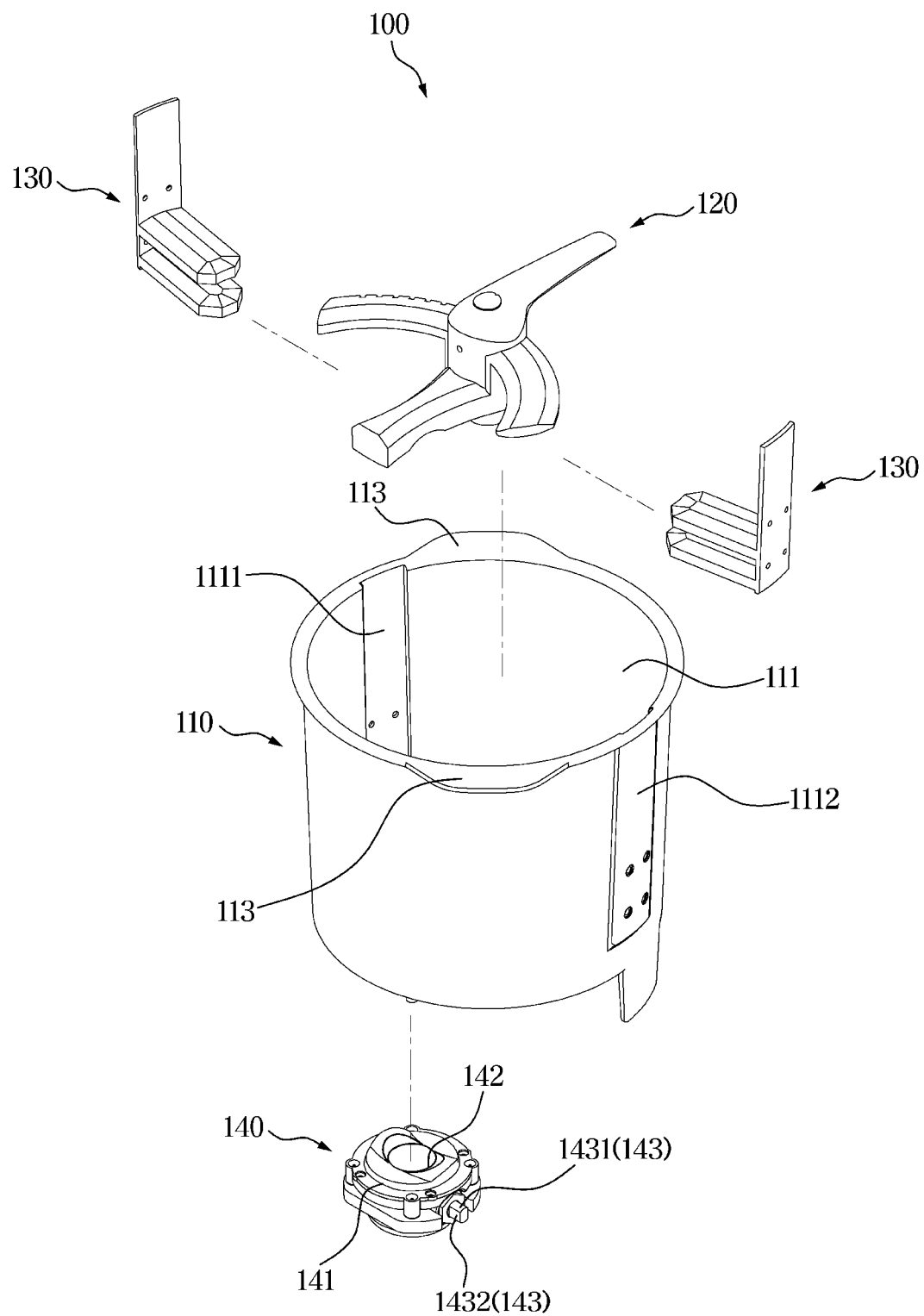
FIG. 9 is an exploded-perspective of a grinding apparatus of the food waste disposer shown in FIG. 8.
Figure 10:
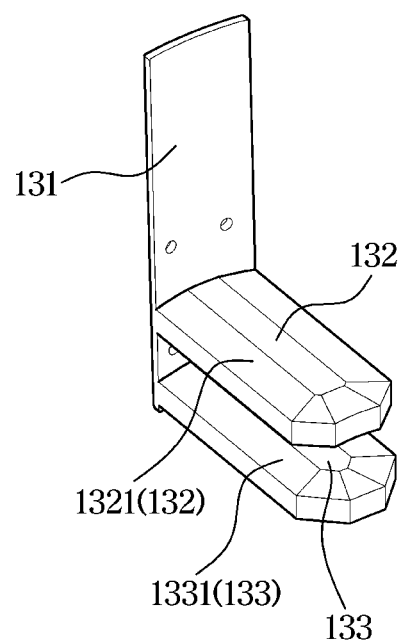
FIG. 10 is a perspective view of a stationary grinder shown in FIG. 9.
Figure 11:
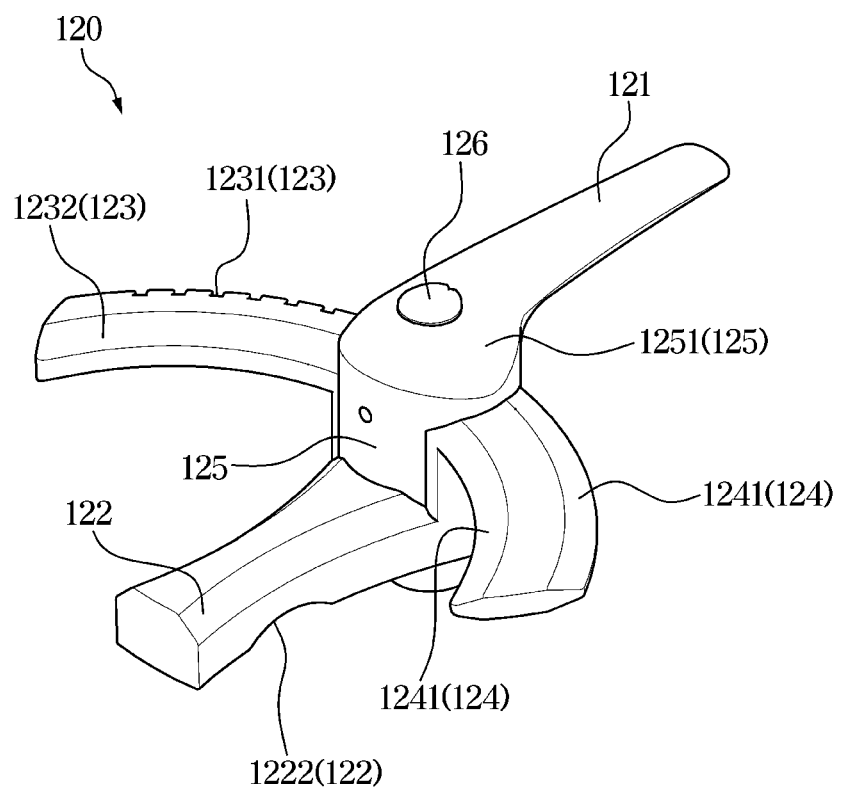
FIG. 11 is a perspective view of a rotary grinder shown in FIG. 9.
Figure 12:
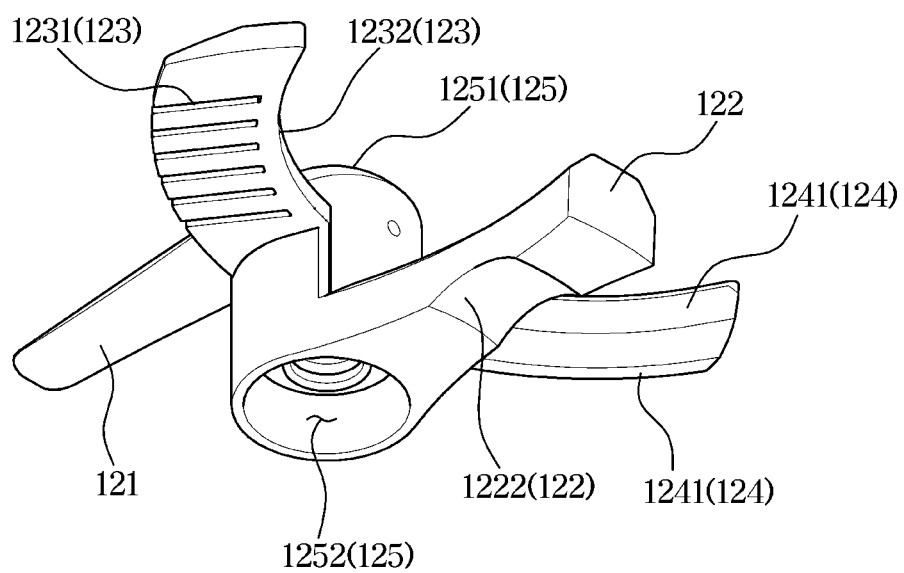
FIG. 12 is a bottom-perspective view of the rotary grinder shown in FIG. 11.
Figure 13:
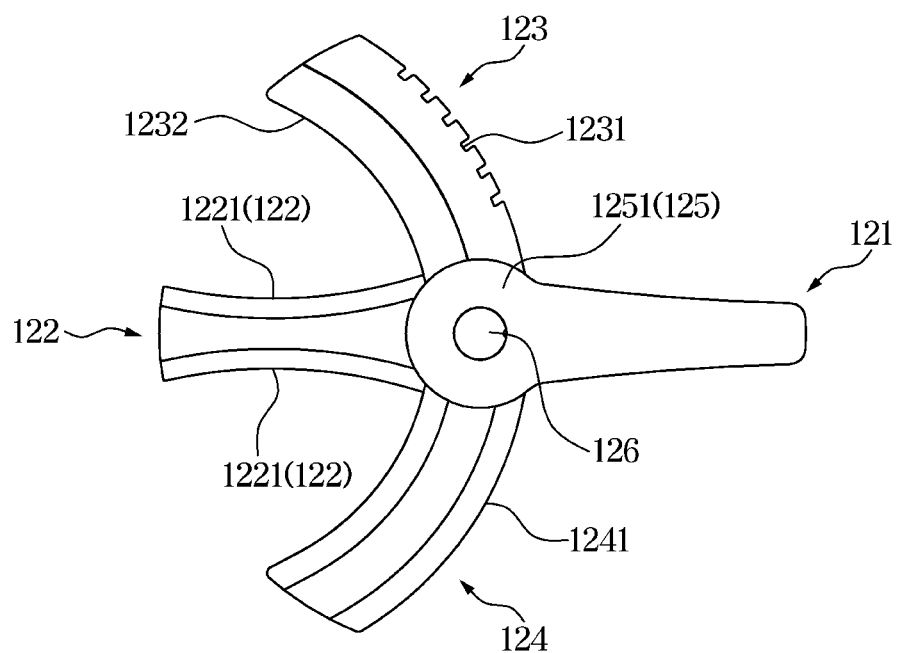
FIG. 13 is a top view of the rotary grinder shown in FIG. 11.

FIG. 9 is an exploded-perspective of a grinding apparatus of the food waste disposer shown in FIG. 8. FIG. 10 is a perspective view of a stationary grinder shown in FIG. 9. FIG. 11 is a perspective view of a rotary grinder shown in FIG. 9. FIG. 12 is a bottom-perspective view of the rotary grinder shown in FIG. 11. FIG. 13 is a top view of the rotary grinder shown in FIG. 11.

Referring to FIG. 9, the grinding apparatus 100 may be detachably mounted on the inside of the housing 10 so as to grind food waste.

The grinding apparatus 100 may include the grinding case 110.

The grinding case 110 may be provided to receive food waste therein. The food received in the grinding case 110 may be heated and dried, stirred, and ground.

The grinding case 110 may be provided in a substantially cylindrical shape with an open upper surface. The grinding case 110 may include one or more handles 113. As shown, the handles 113 may be provided on both sides of the upper end of the grinding case 110. The handles 113 may extend to the outside of the grinding case 110 to be gripped by a user.

It will be appreciated that the shape of the handles 113 of the grinding case 110 are not limited to the illustrative configuration. For example, the handles 113 may be provided such that a portion of the grinding case 110 is cut out and a user puts a finger in the cut-out portion so as to grip the handle 113. The handle 113 may be provided in various shapes without departing from the scope of the present disclosure.

The grinding apparatus 100 may include the valve assembly 140.

The valve assembly 140 may be arranged below the grinding case 110. The valve assembly 140 may be provided to protrude from the lower portion of the grinding case 110.

The valve assembly 140 may be configured to open and close the discharge hole 1121 (refer to FIG. 14) formed in a bottom surface 112 (refer to FIG. 14) of the grinding case 110.

In response to opening the discharge hole 1121 by the valve assembly 140, the food waste ground in the grinding case 110 may be transferred to the storage device 80. The valve assembly 140 and the transfer duct 53 may be connected to communicate with each other.

In some embodiments, and as shown in FIGS. 11-12, a fourth blade 122 rotating at a lowermost side of the rotary grinder 120 to be described later may be provided as a transfer blade, and thus in response to opening the discharge hole 1121 by the valve assembly 140, the fourth blade 122 may transfer the food waste collected on the bottom surface 112 of the grinding case 110 to the discharge hole 1121.

The valve assembly 140 may include a valve receiving case 141, the ball valve 142, and a valve shaft 143.

The valve receiving case 141 may be coupled to the grinding case 110. However, the disclosure is not limited thereto, and the valve receiving case 141 and the grinding case 110 may be integrally formed with each other or the valve receiving case 141 may be otherwise mounted within the food waste disposer 1.

The valve receiving case 141 may be provided to receive the ball valve 142 therein. For example, the valve receiving case 141 may receive the ball valve 142 to allow the ball valve 142 to be rotatable therein.

The ball valve 142 may be rotatable in the valve receiving case 141. The ball valve 142 may be configured to be rotated so as to open and close the discharge hole 1121 of the grinding case 110. For example, the ball valve 142 may be provided in a shape in which an inner portion is opened and a portion surrounding the inner portion is closed.

The valve shaft 143 may be provided to transmit a driving force to the ball valve 142. One end of the valve shaft 143 may be connected to the ball valve 142 and the other end of the valve shaft 143 may be connected to the second driving device 92. Accordingly, the valve shaft 143 may transmit a driving force from the second driving device 92 to the ball valve 142.

The valve shaft 143 may include a first surface 1431 and a second surface 1432. The first surface 1431 and the second surface 1432 may be substantially perpendicular to each other. The shapes of the first surface 1431 and the second surface 1432 may be different from each other.

For example, a width of the first surface 1431 of the valve shaft 143 may be less than a width of the second surface 1432.

Accordingly, in response to the first surface 1431 of the valve shaft 143 facing upward by being connected to the second driving device 92, the valve assembly 140 may be detached upwardly from the second driving device 92.

For example, a portion of a transmission gear (not shown) of the second driving device 92 connected to the valve shaft 143 may be cut to have a width corresponding to the first surface 1431 of the valve shaft 143, and an open portion may face upward. The valve shaft 143 may be received in the cut-out portion of the transmission gear.

Therefore, in response to the transmission gear being rotated to allow the portion, in which the valve shaft 143 is received, of the transmission gear to face upward, the valve shaft 143 may be separated from an upper portion of the transmission gear and thus the valve assembly 140 may be separated from the second driving device 92. Further, the grinding apparatus 100 may be separated from the second driving device 92. In this case, the ball valve 142 is in a state of closing the discharge hole 1121.

Accordingly, a user can separate the grinding apparatus 100 from the housing 10 to wash the grinding case 110 and thus a user can manage the food waste disposer 1, more hygienically.

However, in response to the second surface 1432 of the valve shaft 143 facing upward by being connected to the second driving device 92, the valve assembly 140 may not be separated from the second driving device 92.

In some embodiments, the first surface 1431 and the second surface 1432 may be arranged to be perpendicular to each other, and thus in response to the second surface 1432 facing upward, the first surface 1431 may face a lateral side. Accordingly, the portion, in which the valve shaft 143 is received, of the transmission gear (not shown) of the second driving device 92 may be opened toward the lateral side. The transmission gear (not shown) and the valve shaft 143 may be provided to rotate together with each other. Accordingly, in response to the first surface 1431 of the valve shaft 143 being rotated from an upward-facing state to a side-facing state, the open portion of the transmission gear (not shown) may be changed to face the lateral side.

In this case, in response to the valve assembly 140 being moved upward, the transmission gear (not shown) of the second driving device 92 and the valve shaft 143 may interfere with each other, and thus the valve assembly 140 may not be separated from the second driving device 92. At this time, the ball valve 142 is in a state of opening the discharge hole 1121.

That is, the grinding apparatus 100 may be detached from the second driving device 92 only in a state in which the ball valve 142 closes the discharge hole 1121.

Therefore, in the food waste disposer 1 according to an embodiment of the disclosure, the grinding apparatus 100 may be detached toward the outside of the housing 10 only in a state in which the valve assembly 140 closes the discharge hole 1121. Accordingly, it is possible to prevent the food waste from leaking through the discharge hole 1121 in response to the grinding apparatus 100 being detached by a user, and it is possible to prevent damage to components in an unexpected situation.

Referring to FIGS. 9 and 10, the grinding apparatus 100 may include a stationary grinder 130. The stationary grinder 130 may be provided in plurality. Two stationary grinders 130 of the food waste disposer 1 are provided according to an embodiment of the disclosure, but the number of stationary grinders 130 may not be limited thereto. Alternatively, a single stationary grinder 130 may be provided, and in other embodiments, more than two stationary grinders 130 may be provided.

The stationary grinder 130 may include a stationary body 131.

The stationary body 131 may extend in parallel with a side wall 111 of the grinding case 110. The stationary body 131 may be provided to be mounted on the side wall 111 of the grinding case 110.

The stationary grinder 130 may include a first stationary blade 132 and a second stationary blade 133.

The first stationary blade 132 may extend from the stationary body 131 to the inside of the grinding case 110. The first stationary blade 132 may extend from the stationary body 131 toward the rotary grinder 120.

The second stationary blade 133 may be formed under the first stationary blade 132. The second stationary blade 133 may be arranged to be spaced apart from the first stationary blade 132 such that a gap or space is present between the first stationary blade 132 and the second stationary blade 133, in a vertical direction. The second stationary blade 133 may extend from the stationary body 131 to the inside of the grinding case 110. The second stationary blade 133 may extend from the stationary body 131 toward the rotary grinder 120.

The first stationary blade 132 may include a first chamfer 1321. The first chamfer 1321 may be inclined toward a side end of the first stationary blade 132. The first chamfer 1321 may be provided in a pair. For example, the first chamfer 1321 may be provided to be inclined toward opposite side ends of the first stationary blade 132. In some embodiments, the first chamfer 1321 may extend about a periphery or edge of the first stationary blade 132.

The second stationary blade 133 may include a second chamfer 1331. The second chamfer 1331 may be provided to be inclined toward a side end of the second stationary blade 133. The second chamfer 1331 may be provided in a pair. For example, the second chamfer 1331 may be provided to be inclined toward opposite side ends of the second stationary blade 133. In some embodiments, the second chamfer 1331 may extend about a periphery or edge of the second stationary blade 133.

The first stationary blade 132 and the second stationary blade 133 may be provided with the first chamfer 1321 and the second chamfer 1331, respectively. Therefore, it is possible to easily grind food waste in contact with the first stationary blade 132 and the second stationary blade 133.

Referring to FIGS. 11 to 13, the grinding apparatus 100 may include the rotary grinder 120.

The rotary grinder 120 may include a rotary body 125.

The rotary body 125 may be rotatably coupled to the bottom surface 112 of the grinding case 110.

The rotary body 125 may include a slip member 1251 and a shaft insertion member 1252. The slip member 1251 may be formed on an upper side of the rotary body 125. The slip member 1251 may be formed to include a curved surface.

The shaft insertion member 1252 may be formed on a lower side of the rotary body 125. The shaft insertion member 1252 may be provided inside the rotary body 125 to form a space in which the grinder shaft 127 is inserted into the rotary body 125.

As the grinder shaft 127 is inserted into the shaft insertion member 1252 and the grinder shaft 127 is connected to the drive shaft of the first driving device 91, the driving force of the first driving device 91 may be transmitted to the rotary body 125.

The slip member 1251 may be formed on the upper side of the rotary body 125, and thus food waste may not accumulate in the rotary body 125. The rotary grinder 120 may be configured to stir and grind the food waste inside the grinding case 110 through rotation.

In this case, it is possible to prevent food waste from accumulating in the rotary grinder 120 by providing the slip member 1251 on the upper portion of the rotary body 125 of the rotary grinder 120. That is, the slip member 1251 may be provided to guide the stirred food waste to the lower portion of the rotary body 125.

The rotary grinder 120 may include a cap member 126. The cap member 126 may be mounted on the upper portion of the rotary body 125 to prevent foreign substances from being introduced into the rotary body 125. The cap member 126 is not limited to the illustrative configuration, and the rotary body 125 may be formed integrally with the cap member 126 so as to close the upper portion of the rotary body 125.

The rotary grinder 120 may include a first blade 123 and a second blade 124.

The first blade 123 may extend outwardly from the rotary body 125 to grind the food waste. The first blade 123 may be provided to rotate between the first stationary blade 132 and the second stationary blade 133 of the stationary grinder 130.

The first blade 123 may be provided such that a first member positioned in the front side with respect to the rotation direction and a second member positioned in the rear side with respect to the rotation direction have different shapes.

For example, as shown in FIG. 11, the first blade 123 may include a toothed member 1231 formed in the first member positioned in the front side with respect to the rotation direction. The first blade 123 may include a grinding member 1232 formed in the second member positioned in the rear side with respect to the rotation direction.

The first blade 123 may be formed such that the first member, which is positioned in the front side with respect to the rotation direction, is inclined toward the end. Particularly, a portion of the upper surface of the first blade 123 may be provided to be inclined downward.

The first blade 123 may be formed in such a way that the first member positioned in the front side and the second member positioned in the rear side with respect to the rotation direction have different thicknesses. Particularly, the portion in which the toothed member 1231 of the first blade 123 is formed may include an inclined surface. Accordingly, a thickness of one side and a thickness of the other side of the first blade 123 in the vertical direction may be provided to be different from each other.

The second blade 124 may extend outwardly from the rotary body 125 to grind the food waste. The second blade 124 may be provided to rotate between the first stationary blade 132 and the second stationary blade 133 of the stationary grinder 130.

The second blade 124 may be provided to have a shape different from that of the first blade 123.

The second blade 124 may include a blade member 1241 that is respectively formed in the front side and rear side with respect to the rotation direction. However, the disclosure is not limited thereto, and the blade member 1241 may be formed only in the front side or only in the rear side of the second blade 124 based on the rotation direction.

The first blade 123 and the second blade 124 may be formed at the same height with respect to the vertical direction. However, the disclosure is not limited thereto, and the first blade 123 and the second blade 124 may have different heights as long as the first blade 123 and the second blade 124 are rotatably provided between a third blade 121 and the fourth blade 122 of the rotary grinder 120.

The first blade 123 may extend from the rotary body 125 in a curved shape along the rotation direction. The second blade 124 may curvedly extend from the rotary body 125 in a direction opposite to the rotation direction.

That is, the first blade 123 and the second blade 124 may extend from the rotary body 125 in a curved shape to allow each end thereof to face each other in the radial direction.

Therefore, the first blade 123 and the second blade 124 may be provided to increase a contact area with the food waste. In addition, as an extension direction of the first blade 123 and the second blade 124 are different from each other, a performance of stirring and grinding food waste by the rotary grinder 120 may be further improved.

In addition, a shape of the toothed member 1231 and the grinding member 1232 of the first blade 123 is not limited to the above-described example. For example, a position of the toothed member 1231 and the grinding member 1232 of the first blade 123 may be changed from each other.

The rotary grinder 120 may include the third blade 121 and the fourth blade 122.

The third blade 121 may extend outwardly from the rotary body 125 to stir the food waste. The third blade 121 may be provided to rotate above the first stationary blade 132 and the second stationary blade 133 of the stationary grinder 130.

The fourth blade 122 may be provided to transfer food waste from the bottom surface 112 of the grinding case 110 to the discharge hole 1121. The fourth blade 122 may extend outwardly from the rotary body 125. The fourth blade 122 may be provided to rotate under the first stationary blade 132 and the second stationary blade 133 of the stationary grinder 130.

A width of an upper surface of the third blade 121 may become smaller outwardly in the radial direction.

As the rotary grinder 120 stirs the food waste through the rotation, the food waste may gradually accumulate in a direction away from a rotation axis of the rotary grinder 120. Particularly, the food waste may be gathered toward the side wall 111 of the grinding case 110 while being stirred.

Accordingly, as the width of the upper surface of the third blade 121 is gradually reduced in the direction away from the rotation axis of the rotary grinder 120, it is possible to prevent the food waste from gathering on the side wall 111 of the grinding case 110.

The fourth blade 122 may include a concave member 1221, as shown in FIG. 13.

The concave member 1221 may be recessed inward from the front side and rear side, respectively, with respect to the rotation direction of the fourth blade 122. The concave member 1221 may be recessed in a curved shape.

The concave member 1221 may be provided to be connected to the rotary body 125 along a tangential direction of an outer surface of the rotary body 125.

The fourth blade 122 may be provided to stir food waste on the bottom surface 112 of the grinding case 110 and transfer the food waste to the discharge hole 1121 if necessary. Accordingly, a reaction force applied on the fourth blade 122 may be the greatest. That is, the fourth blade 122 may be provided to stir a lower portion of the stacked food waste.

Accordingly, the fourth blade 122 may have the greatest thickness in the vertical direction in comparison with other blades. The thickness in the vertical direction of the fourth blade 122 may be greater than a thickness in the vertical direction of the third blade 121. The thickness in the vertical direction of the fourth blade 122 may be greater than a thickness in the vertical direction of the first blade 123 and the second blade 124 to be described later.

In addition, as the concave member 1221 is formed in the fourth blade 122, a contact area between the fourth blade 122 and the food waste may increase. Accordingly, the stirring performance of the fourth blade 122 may be improved. In addition, as the concave member 1221 is formed in the fourth blade 122, the fourth blade 122 may transfer the food waste to the discharge hole 1121 without leaving any residue.

The fourth blade 122 may include a recess 1222.

The recess 1222 may be recessed inward from the lower surface to prevent interference between the ball valve 142, which protrudes to the upper portion of the bottom surface 112 through the discharge hole 1121 of the grinding case 110, and the fourth blade 122. Accordingly, a shape of the recess 1222 of the fourth blade 122 may correspond to the ball valve 142 or a portion thereof.

In addition, the recess 1222 may correspond to the shape of a protrusion 1123 of the grinding case 110 to be described later and shown in FIG. 14.

In addition, the rotation direction of the rotary grinder 120 may be alternately changed in a clockwise direction and a counterclockwise direction. That is, the rotary grinder 120 may be provided to rotate alternately in both directions instead of being provided to rotate in only one direction. Therefore, the position of the front side with respect to the rotation direction and the position of the rear side with respect to the rotation direction may be reversed at any time.

FIG. 14 is a perspective view illustrating an inside of a grinding case shown in FIG. 9.

Referring to FIG. 14, the grinding case 110 may include the sidewall 111 formed to be perpendicular to the bottom surface 112. The side wall 111 may form an upper exterior of the grinding case 110.

A first grinder mounting member 1111 and a second grinder mounting member 1112 may be formed on the sidewall 111 of the grinding case 110.

The first grinder mounting member 1111 may be recessed inward from the side wall 111 of the grinding case 110. The first grinder mounting member 1111 may be provided to receive the stationary body 131 of the stationary grinder 130. The stationary grinder 130 may be coupled to the first grinder mounting member 1111.

The second grinder mounting member 1112 may be provided in the same shape as the first grinder mounting member 1111.

The second grinder mounting member 1112 may be recessed inward from the side wall 111 of the grinding case 110. The second grinder mounting member 1112 may be provided to receive a stationary body 131 of a stationary grinder 130. The stationary grinder 130 may be coupled to the second grinder mounting member 1112. The mounting or coupling of the stationary grinders 130 to the grinder mounting members 1111, 1112 may be any means, including, without limitation, fasteners, adhesives, bonding, welding, or the like, as will be appreciated by those of skill in the art.

The food waste disposer 1 according to an embodiment of the disclosure has been illustrated and described to include two stationary grinders 130, and thus two grinder mounting members 1111, 1112 are also provided. However, the number of grinder mounting members is not limited thereto, and the number of grinder mounting members may be provided to correspond to the number of stationary grinders 130.

The grinding case 110 may include the discharge hole 1121, a drive shaft through hole 1122, and the protrusion 1123 formed in the bottom surface 112.

The drive shaft through hole 1122 may be provided to allow the grinder shaft 127 to pass therethrough. The grinder shaft 127 coupled to the first driving device 91 may be received in the grinding case 110 through the drive shaft through hole 1122.

As the rotary body 125 is coupled to the grinder shaft 127, the rotary grinder 120 may receive the driving force from the first driving device 91.

The discharge hole 1121 may be provided to allow the food waste ground inside the grinding case 110 to be transferred to the transfer duct 53. Particularly, the discharge hole 1121 may be provided to communicate with the valve assembly 140.

Accordingly, in response to opening the discharge hole 1121 by the valve assembly 140, the rotary grinder 120 may transfer the food waste to the discharge hole 1121, and the food waste transferred to the discharge hole 1121 may be moved to the transfer duct 53 through the valve assembly 140. The food waste moved to the transfer duct 53 may be received in the storage case 82.

The protrusion 1123 may protrude upward from the bottom surface 112.

The ball valve 142 of the valve assembly 140 may protrude from the bottom surface 112 of the grinding case 110 through the discharge hole 1121. Accordingly, the fourth blade 122 includes the recess 1222 to avoid the interference with the ball valve 142.

However, as the recess 1222 is formed on the lower surface of the fourth blade 122 in a state in which the bottom surface 112 of the grinding case 110 is formed to be flat, food waste, which is placed in a space between the recess 1222 and the bottom surface 112, may be not transferred by the fourth blade 122.

Therefore, as the protrusion 1123 having a shape corresponding to the recess 1222 of the fourth blade 122 is formed on the bottom surface 112 of the grinding case 110, the fourth blade 122 may transfer food waste, which accumulates on the bottom surface 112 of the grinding case 110, to the discharge hole 1121 without leaving any residue, or the fourth blade 122 may stir the food waste.

Figure 15:
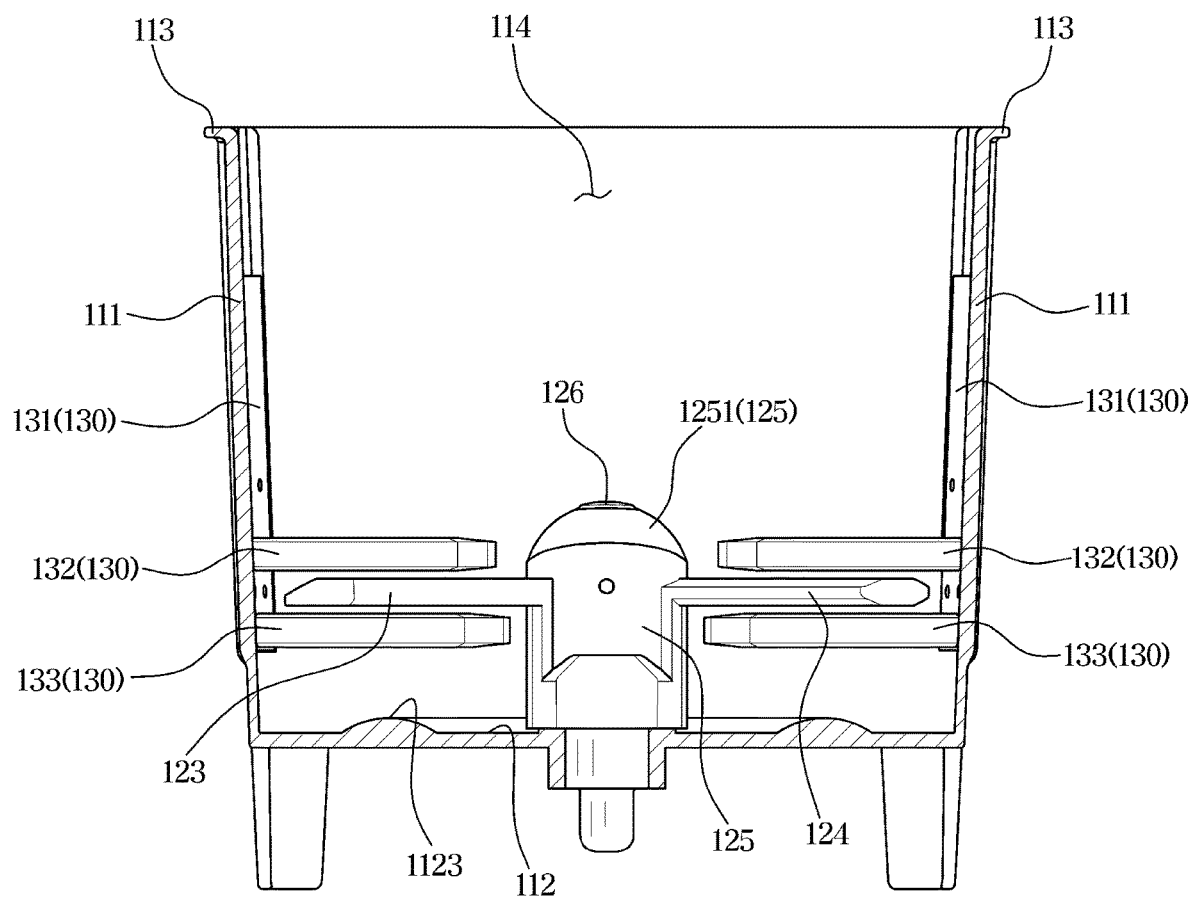
FIG. 15 is a view illustrating a relative position of the stationary grinder and the rotary grinder in the grinding apparatus of the food waste disposer according to an embodiment of the disclosure.
Figure 16:
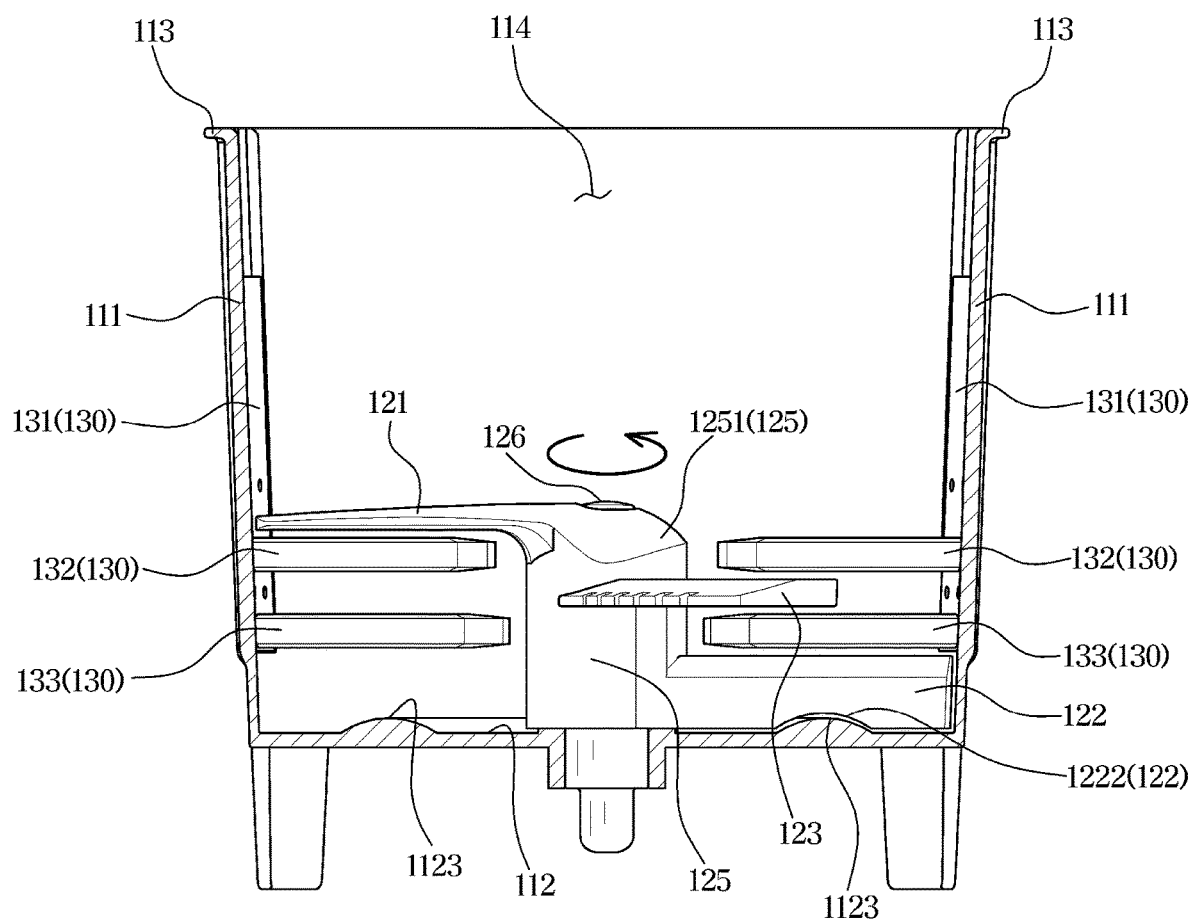
FIG. 16 is a view illustrating a relative position of the stationary grinder and the rotary grinder in response to a rotation of the rotary grinder shown in FIG. 15.

FIG. 15 is a view illustrating a relative position of the stationary grinder and the rotary grinder in the grinding apparatus of the food waste disposer according to an embodiment of the disclosure. FIG. 16 is a view illustrating a relative position of the stationary grinder and the rotary grinder in response to a rotation of the rotary grinder shown in FIG. 15.

Referring to FIG. 15, the stationary grinder 130 is fixedly mounted to the side wall 111 of the grinding case 110. The first blade 123 and the second blade 124 of the rotary grinder 120 may be rotatable between the first stationary blade 132 and the second stationary blade 133 of the stationary grinder 130.

The first blade 123, the first stationary blade 132, and the second stationary blade 133 may be arranged to be vertically spaced apart from each other. The second blade 124, the first stationary blade 132, and the second stationary blade 133 may be arranged to be vertically spaced apart from each other.

Referring to FIG. 16, as the rotary grinder 120 rotates, the third blade 121 of the rotary grinder 120 may rotate above the first stationary blade 132 of the stationary grinder 130. The fourth blade 122 of the rotary grinder 120 may rotate under the second stationary blade 133 of the stationary grinder 130.

The third blade 121 and the first stationary blade 132 may be arranged to be vertically spaced apart from each other. The fourth blade 122 and the second stationary blade 133 may be arranged to be vertically spaced apart from each other.

Accordingly, each of the blades of the stationary grinder 130 and the rotary grinder 120 may rotate relative to each other while being spaced apart from each other by a predetermined distance in the vertical direction. Therefore, it is possible to prevent damage to the parts of the stationary grinder 130 and the rotary grinder 120.

In addition, food waste may be ground by an interaction of the first stationary blade 132 and the second stationary blade 133 of the stationary grinder 130, and the third blade 121 and the second blade 124 of the rotary grinder 120. Accordingly, the grinding performance of the food waste disposer 1 may be improved.

In addition, the third blade 121, the fourth blade 122, the first blade 123, and the second blade 124 of the rotary grinder 120 may have different shapes from each other, thereby performing different functions. Accordingly, the performance of the rotary grinder may be improved.

As is apparent from the above description, a food waste disposer may improve a stirring and grinding performance by improving a shape of a plurality of blades of a rotary grinder.

Further, because a plurality of blades of a rotary grinder is provided to have different shapes at different heights, a food waste disposer may improve a performance of grinding food waste by an interaction between a stationary grinder between the rotary grinder.

Further, a food waste disposer may more efficiently dry food waste because a circulation fan is embedded in a cover device so as to facilitate a heat circulation inside a grinding apparatus.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A food waste disposer comprising:
   a housing;
   a grinding apparatus detachably mounted inside the housing and configured to grind food waste; and
   a storage case arranged below the grinding apparatus so as to store ground food waste,
   wherein the grinding apparatus comprises:
   a grinding case comprising a discharge hole opened to allow the ground food waste to be transferred to the storage case;
   a stationary grinder comprising a plurality of stationary blades coupled to a side wall of the grinding case and provided to extend inwardly within an interior of the grinding case;
   a rotary body rotatably coupled to a bottom surface of the grinding case;
   a first blade extending from the rotary body to grind food waste and provided to rotate between the plurality of stationary blades, the first blade having a first member positioned on a front side with respect to a rotation direction and a second member positioned on a rear side with respect to the rotation direction, the second member having a different shape from the first member; and
   a second blade extending from the rotary body and provided to rotate between the plurality of stationary blades, the second blade having a shape different than a shape of the first blade;
   wherein the first blade extends from the rotary body in a curved shape along the rotation direction, and the second blade extends from the rotary body in the curved shape along a direction opposite to the rotation direction.

2. The food waste disposer of claim 1, wherein
   the first member of the first blade comprises a toothed member and the second member comprises a grinding member.

3. The food waste disposer of claim 2, wherein
   the first member of the first blade is provided to be inclined toward an end with respect to the rotation direction.

4. The food waste disposer of claim 2, wherein
   a thickness of the first member is less than or equal to a thickness of the second member with respect to a vertical direction.

5. The food waste disposer of claim 1, wherein
   the second blade comprises a blade member formed on both a front side and a rear side with respect to the rotation direction.

6. The food waste disposer of claim 1, further comprises:
   a third blade extending from the rotary body to stir food waste and provided to rotate above the plurality of stationary blades; and
   a fourth blade extending from the rotary body and provided to rotate under the plurality of stationary blades to transfer food waste from the bottom surface of the grinding case to the discharge hole,
   wherein a width of an upper surface of the third blade becomes smaller outwardly in a radial direction.

7. The food waste disposer of claim 6, wherein
   the fourth blade comprises a concave member recessed inward from a front side and a rear side with respect to the rotation direction.

8. The food waste disposer of claim 7, wherein
   the concave member is provided to be connected to the rotary body along a tangential direction of an outer surface of the rotary body.

9. The food waste disposer of claim 1, wherein
   the first blade and the second blade are positioned at the same height as each other.

10. The food waste disposer of claim 1, wherein
    the grinding apparatus further comprises:
    a valve assembly comprising a ball valve arranged below the grinding case and configured to open and close the discharge hole, the valve assembly provided to be detached toward an outside of the housing, together with the grinding case.

11. The food waste disposer of claim 10, wherein
    the grinding apparatus further comprises a fourth blade having a recess recessed inward from a lower surface to prevent interference with the ball valve protruding toward an upper portion of the bottom surface through the discharge hole of the grinding case.

12. The food waste disposer of claim 10, wherein the valve assembly further comprises:
- a first driving device comprising a first drive shaft and being configured to supply a driving force to the rotary body; and
- a second driving device comprising a second drive shaft and being configured to supply a driving force to the ball valve,
- wherein the grinding apparatus is detached from the second driving device in response to the discharge hole being closed by the ball valve.

13. The food waste disposer of claim 1, further comprising:
- a heat generator configured to heat the grinding apparatus; and
- a cover device coupled to an upper portion of the housing so as to open and close the grinding apparatus, the cover device comprising a circulation fan received inside the cover device so as to circulate heat inside the grinding apparatus.

14. The food waste disposer of claim 1, further comprising:
- a cap member mounted to an upper portion of the rotary body to prevent foreign substances from being introduced into the rotary body.

15. A food waste disposer comprising:
- a grinding case comprising a bottom surface and a side wall extending upward from the bottom surface and defining an interior of the grinding case and a discharge hole formed in the bottom surface;
- at least one stationary grinder comprising a plurality of stationary blades coupled to the side wall of the grinding case and provided to extend inwardly within the interior of the grinding case;
- a rotary body rotatably coupled to the bottom surface of the grinding case;
- a first blade extending from the rotary body to grind food waste and provided to rotate between the plurality of stationary blades of the at least one stationary grinder, the first blade having a first member positioned on a front side with respect to a rotation direction and a second member positioned on a rear side with respect to the rotation direction, the second member having a different shape from the first member; and
- a second blade extending from the rotary body and provided to rotate between the plurality of stationary blades, the second blade having a shape different than a shape of the first blade;
- wherein the first blade extends from the rotary body in a curved shape along the rotation direction, and the second blade extends from the rotary body in the curved shape along a direction opposite to the rotation direction.

16. The food waste disposer of claim 15, further comprising:
- a third blade extending from the rotary body and arranged above each of the first blade and the second blade, relative to the bottom surface; and
- a fourth blade extending from the rotary body and arranged below each of the first blade and the second blade, relative to the bottom surface.

17. The food waste disposer of claim 15, wherein the at least one stationary grinder comprises two stationary grinders attached to the side wall of the grinding case, wherein each stationary grinder comprises a respective plurality of stationary blades.

18. The food waste disposer of claim 15, wherein the bottom surface comprises a protrusion extending upward from the bottom surface into the interior of the grinding case.

19. The food waste disposer of claim 15, wherein the first blade extends at a first curvature relative to the rotary body and the second blade extends at a second curvature relative to the rotary body, wherein the first curvature and the second curvature are in opposite directions.

\* \* \* \* \*